(12) United States Patent
Kurafuji et al.

(10) Patent No.: US 11,137,937 B2
(45) Date of Patent: Oct. 5, 2021

(54) INFORMATION PROCESSING DEVICE AND CONTROL METHOD DETERMINING VALID DATA IN MULTIPLE MEMORY AREAS BASED ON MULTIPLE VALID FLAGS

(71) Applicant: RENESAS ELECTRONICS CORPORATION, Tokyo (JP)

(72) Inventors: Takashi Kurafuji, Tokyo (JP); Satoshi Yamamoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 164 days.

(21) Appl. No.: 16/450,294

(22) Filed: Jun. 24, 2019

(65) Prior Publication Data

US 2020/0019341 A1 Jan. 16, 2020

(30) Foreign Application Priority Data

Jul. 12, 2018 (JP) .............................. JP2018-132068

(51) Int. Cl.
*G06F 3/06* (2006.01)
*G06F 12/02* (2006.01)

(52) U.S. Cl.
CPC .......... *G06F 3/0658* (2013.01); *G06F 3/0614* (2013.01); *G06F 3/0619* (2013.01); *G06F 3/0629* (2013.01); *G06F 3/0644* (2013.01); *G06F 3/0652* (2013.01); *G06F 3/0659* (2013.01); *G06F 3/0679* (2013.01); *G06F 12/0246* (2013.01); *G06F 2212/1032* (2013.01); *G06F 2212/7205* (2013.01); *G06F 2212/7207* (2013.01); *G06F 2212/7209* (2013.01)

(58) Field of Classification Search
CPC .... G06F 3/0658; G06F 3/0619; G06F 3/0652; G06F 3/0659; G06F 3/0679; G06F 2212/1032; G06F 2212/7207; G06F 2212/7209; G06F 2212/7205; G06F 12/0246; G06F 3/0644; G06F 3/0629; G06F 3/0614
See application file for complete search history.

(56) References Cited

U.S. PATENT DOCUMENTS 9,229,863 B2 * 1/2016 Yoshihashi ......... G06F 12/0804
9,563,553 B2 * 2/2017 Lin ..................... G06F 12/0246
9,703,486 B2 * 7/2017 Yano ....................... G06F 3/064
(Continued)

FOREIGN PATENT DOCUMENTS

JP 2016-133874 A 7/2016

*Primary Examiner* — Christopher D Birkhimer
(74) *Attorney, Agent, or Firm* — McDermott Will & Emery LLP

(57) ABSTRACT

A master issues the valid data is specified when the data update processing is interrupted.
The control unit 3 stores in the storage unit 2 the second update status flag 8_2, which indicates the update status of the first update status flag 8_1 and the second data 6_2, which indicate the update status of the first data 6_1, and the third update status flag 8_3, which indicates the update status of the valid indication flag 7. When the determination based on the valid instruction flag 7 is impossible, the usage data determination unit 4 determines which of the first data 6_1 and the second data 6_2 is valid based on the values of the first update status flag 8_1, the second update status flag 8_2, and the third update status flag 8_3.

12 Claims, 29 Drawing Sheets

(56) References Cited

U.S. PATENT DOCUMENTS

| | | | |
|---|---|---|---|
| 9,916,103 B2* | 3/2018 | Hosogaya | G06F 11/1474 |
| 2006/0005074 A1* | 1/2006 | Yanai | G06F 3/061 |
| | | | 714/6.32 |
| 2016/0179609 A1* | 6/2016 | Zhou | G11C 7/00 |
| | | | 714/6.13 |
| 2016/0210070 A1* | 7/2016 | Kurafuji | G06F 3/0679 |
| 2016/0217068 A1* | 7/2016 | Lin | G06F 12/0246 |
| 2016/0378656 A1* | 12/2016 | Kudo | G06F 12/0815 |
| | | | 711/143 |
| 2017/0269843 A1* | 9/2017 | Yano | G06F 3/0685 |
| 2018/0095693 A1* | 4/2018 | Kikkawa | G06F 3/0644 |

* cited by examiner

FIG. 6

| COMMAND | COMMAND OF FLASH SEQUENCER ||||||
| | FIRST | SECOND | THIRD | FOURTH | FIFTH | SIXTH |
|---|---|---|---|---|---|---|
| SWITCH AREA ERASE | H'87 | H'D0 | - | - | - | - |
| SWITCH AREA WRITE | H'85 | H'08 | WD0 | WD1 | WD2 | H'D0 |
| TAG AREA ERASE | H'89 | H'D0 | - | - | - | - |
| TAG AREA WRITE | H'83 | H'D0 | - | - | - | - |

FIG. 11A

| COMMAND | Step | D0-0 | D0-1 | D0-2 | ... | A0PC | A1ES | A1EC | TES0 | TEC0 |
|---|---|---|---|---|---|---|---|---|---|---|
| (Before UPDATE) | — | D000 | D010 | D020 | ... | P | P | P | P | P |
| SWITCH AREA ERASE | 1 | D000 | D010 | D020 | ... | P | P | P | P | P |
|  | 2 | E | E | E | ... | E | E | E | E | E |
|  | 3 | E | E | E | ... | E | E | E | E | E |
| SWITCH AREA WRITE | 1 | D001 | E | E | ... | E | E | E | E | E |
|  | 2 | D001 | D011 | E | ... | E | E | E | E | E |
|  | 3 | D001 | D011 | D021 | ... | E | E | E | E | E |
|  | 4 | D001 | D011 | D021 | ... | E | E | E | E | E |
| TAG AREA ERASE | 1 | D001 | D011 | D021 | ... | P | E | E | E | E |
|  | 2 | D001 | D011 | D021 | ... | P | E | E | P | E |
|  | 3 | D001 | D011 | D021 | ... | P | E | E | P | P |
| TAG AREA UPDATE | 1 | D001 | D011 | D021 | ... | P | E | E | P | P |
|  | 2 | D001 | D011 | D021 | ... | P | E | E | P | P |

SWITCH AREA 100_0

*FIG. 11B*

| COMMAND | Step | SWITCH AREA 100_1 | | | | | | | | | |
|---|---|---|---|---|---|---|---|---|---|---|---|
| | | D1-0 | D1-1 | D1-2 | ... | A1PC | A0ES | A0EC | TES1 | TEC1 |
| (Before UPDATE) | — | D100 | D110 | D120 | ... | | E | E | P | P |
| SWITCH AREA ERASE | 1 | D100 | D110 | D120 | ... | P | P | E | P | P |
| | 2 | D100 | D110 | D120 | ... | P | P | E | P | P |
| | 3 | D100 | D110 | D120 | ... | P | P | P | P | P |
| SWITCH AREA WRITE | 1 | D100 | D110 | D120 | ... | P | P | P | P | P |
| | 2 | D100 | D110 | D120 | ... | P | P | P | P | P |
| | 3 | D100 | D110 | D120 | ... | P | P | P | P | P |
| | 4 | D100 | D110 | D120 | ... | P | P | P | P | P |
| TAG AREA ERASE | 1 | D100 | D110 | D120 | ... | P | P | P | P | P |
| | 2 | D100 | D110 | D120 | ... | P | P | P | P | P |
| | 3 | D100 | D110 | D120 | ... | P | P | P | P | P |
| TAG AREA UPDATE | 1 | D100 | D110 | D120 | ... | P | P | P | P | P |
| | 2 | D100 | D110 | D120 | ... | P | P | P | P | P |

FIG. 11C

| COMMAND | Step | TAG AREA | |
|---|---|---|---|
| | | VAF | VAPC |
| (Before UPDATE) | — | Area 1 | P |
| SWITCH AREA ERASE | 1 | Area 1 | P |
| | 2 | Area 1 | P |
| | 3 | Area 1 | P |
| SWITCH AREA WRITE | 1 | Area 1 | P |
| | 2 | Area 1 | P |
| | 3 | Area 1 | P |
| | 4 | Area 1 | P |
| TAG AREA ERASE | 1 | Area 1 | P |
| | 2 | E | E |
| | 3 | E | E |
| TAG AREA UPDATE | 1 | Area 0 | E |
| | 2 | Area 0 | P |

FIG. 12

| STATES | SWITCH AREA 100_0 | | | | SWITCH AREA 100_1 | | | | TAG AREA | | VALID AREA JUDGEMENT RESULT |
|---|---|---|---|---|---|---|---|---|---|---|---|
| | A1ES | A1EC | TES0 | TEC0 | A0ES | A0EC | TES1 | TEC1 | VAF | VAPC | |
| (A) | X | X | X | X | X | X | X | X | Area1 | P | SWITCH AREA 100_1 |
| (B) | E | E | P | E | P | P | P | P | X | X | SWITCH AREA 100_1 |
| (C) | E | E | P | P | P | P | P | P | E | E | SWITCH AREA 100_1 |
| (D) | E | E | P | P | P | P | P | P | X | E | SWITCH AREA 100_1 |
| (E) | X | X | X | X | X | X | X | X | Area0 | P | SWITCH AREA 100_0 |
| (F) | P | P | P | P | E | E | P | E | X | X | SWITCH AREA 100_0 |
| (G) | P | P | P | P | E | E | P | P | E | E | SWITCH AREA 100_0 |
| (H) | P | P | P | P | E | E | P | P | X | E | SWITCH AREA 100_0 |

FIG. 19

| COMMAND | WRITE ACCESS TO FLASH SEQUENCER | | | | | | |
|---|---|---|---|---|---|---|---|
| | FIRST | SECOND | THIRD | FOURTH | FIFTH | SIXTH | SEVENTH |
| SETTING AREA ERASE | H'47 | H'00 | - | - | - | - | - |
| SETTING AREA WRITE | H'45 | H'08 | WD0 | WD1 | WD2 | WD3 | H'D0 |

FIG. 22A

| COMMAND | Step | CNF_0 | | | | | | | | |
|---|---|---|---|---|---|---|---|---|---|---|
| | | OPBT0 | ... | OPBTx | ... | VOF0 | ... | VOFx | VOFC0 | ... | VOF0x |
| BEFORE UPDATE | | P | ... | P | ... | P | ... | P | P | ... | P |
| SET AREA ERASE | 1 | E | ... | E | ... | E | ... | E | E | ... | E |
| SET AREA WRITE (OPBT0) | 1 | P | ... | E | ... | E | ... | E | E | ... | E |
| | 2 | P | ... | E | ... | P | ... | E | E | ... | E |
| | 3 | P | ... | E | ... | P | ... | E | E | ... | E |
| ... | | | | | | | | | | | |
| SET AREA WRITE (OPBTx) | 1 | P | ... | P | ... | P | ... | E | P | ... | E |
| | 2 | P | ... | P | ... | P | ... | P | P | ... | E |
| | 3 | P | ... | P | ... | P | ... | P | P | ... | P |

FIG. 22B

| COMMAND | Step | OPBT0 | ... | OPBTx | VOF0 | ... | VOFx | VOFC0 | ... | VOFCx |
|---|---|---|---|---|---|---|---|---|---|---|
| | | | | | CNF_1 | | | | | |
| BEFORE UPDATE | | p | | p | p | | p | p | | p |
| SET AREA ERASE | 1 | p | | p | p | | p | p | | p |
| SET AREA WRITE (OPBT0) | 1 | p | | p | p | | p | p | | p |
| | 2 | p | | p | p | | p | p | | p |
| | 3 | p | | p | p | | p | p | | p |
| ... | | ... | | ... | ... | | ... | ... | | ... |
| SET AREA WRITE (OPBTx) | 1 | p | | p | p | | p | p | | p |
| | 2 | p | | p | p | | p | p | | p |
| | 3 | p | | p | p | | p | p | | p |

INFORMATION PROCESSING DEVICE AND CONTROL METHOD DETERMINING VALID DATA IN MULTIPLE MEMORY AREAS BASED ON MULTIPLE VALID FLAGS

CROSS-REFERENCE TO RELATED APPLICATIONS

The disclosure of Japanese Patent Application No. 2018-132068 filed on Jul. 12, 2018 including the specification, drawings and abstract is incorporated herein by reference in its entirety.

BACKGROUND

The present invention relates to an information processing device and a method of control, and, for example, to a technique for determining valid data.

Japanese unexamined Patent Application publications No. 2016-133874 discloses an information processing device for storing the number of erases of data in a flash memory. In this information processing device, the number of erases is managed by three memory areas, i.e., an A area, a B area, and a flag area. One of the A area and the B area stores the number of erases before update, and the other stores the number of erases after update. A flag indicating which area is valid, that is, which area stores the current number of erases is stored in the flag area.

In this information processing device, when the flag indicates that the A area is valid, after the B area is erased, the updated number of erases is stored in the B area, and thereafter, the flag is rewritten so as to indicate that the B area is valid.

With such a configuration, even if the update processing of the number of erases is interrupted, the stored number of erases is not lost.

SUMMARY

However, in the above-described technique, if the processing is interrupted during the flag rewriting process due to an unexpected situation or the like, an appropriate value is not stored as the flag. That is, it may become uncertain which of the A area and the B area is valid. In addition, when the content stored in the A area and the B area is not the number of times of erase but setting data (for example, setting data specifying a memory area to be accessed at the time of system startup, security setting data, or the like) in a device such as an MCU (Micro Control Unit: microcontroller unit), it means that the setting data becomes uncertain. In such a case, unintentional switching of software or security settings may occur, causing a system failure. Therefore, there is a need for a technique capable of specifying valid data even if data update processing is interrupted.

Other objects and novel features will become apparent from the description of this specification and the accompanying drawings.

According to one embodiment, the control unit stores in the storage unit a first update status flag indicating the update status of the first data, a second update status flag indicating the update status of the second data, and a third update status flag indicating the update status of the valid instruction flag, and the usage data determination unit determines which of the first data and the second data is valid based on the values of the first update status flag, the second update status flag, and the third update status flag when the determination based on the valid instruction flag is impossible.

BRIEF DESCRIPTION OF THE DRAWINGS

FIG. 6 is a diagram showing commands of the flash sequencer 17.

FIG. 11A is a table showing the transition of each setting data and each flag in switch area 100_0.

FIG. 11B is a table showing transition of each setting data and each flag in the switch area 100_1;

FIG. 11C is a table showing the transition of the flag in the tag area 200.

FIG. 12 is a table showing an example of a reference pattern

FIG. 19 is a diagram showing commands for a setting area 300.

FIG. 22A is a table showing the transition of each function setting data and each flag in the division area CNF_0.

FIG. 22B is a table showing transition of each function setting data and each flag in a divided area CNF_1.

DETAILED DESCRIPTION

Figure 1:
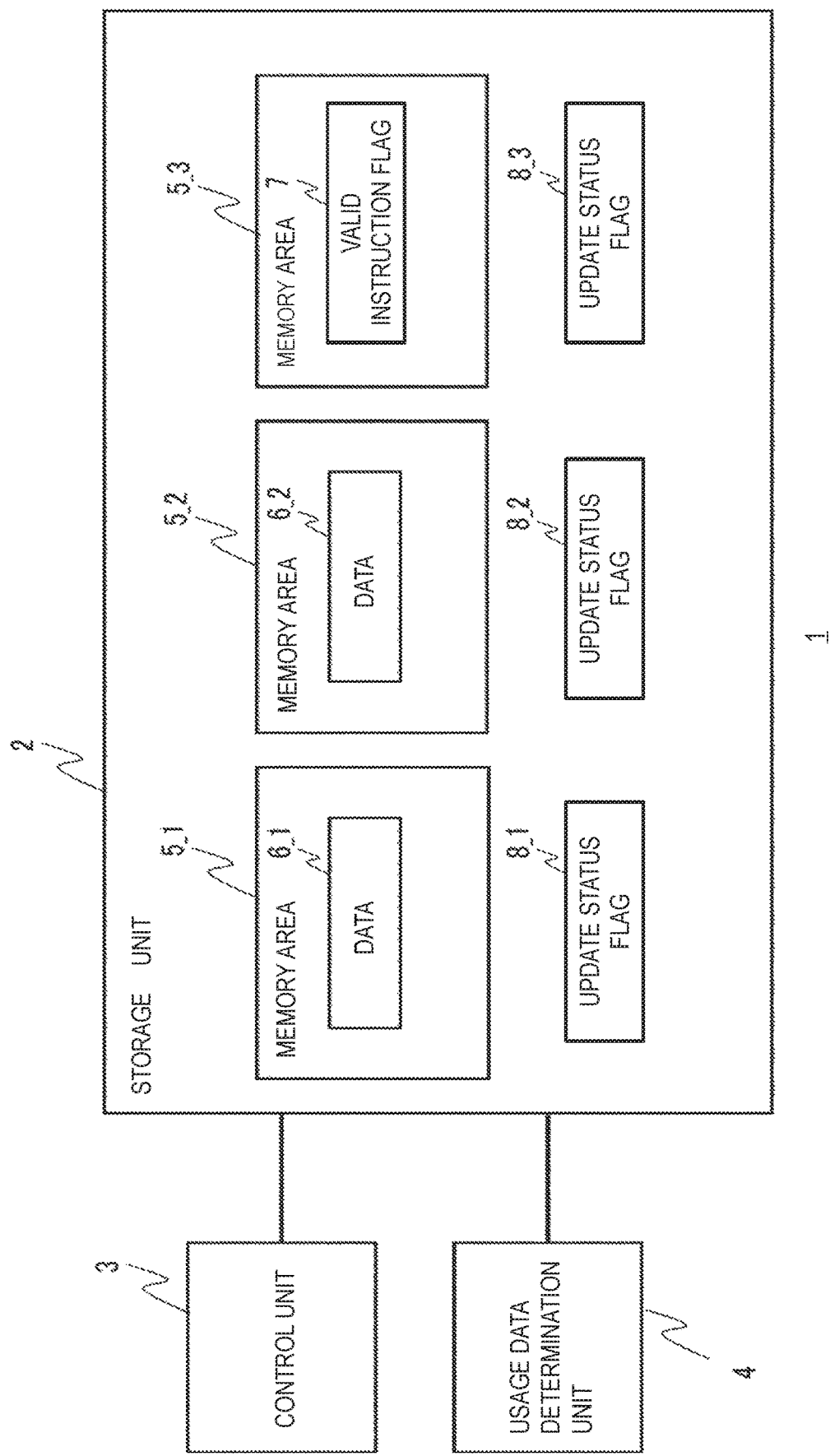
FIG. 1 is a block diagram illustrating showing an example of a configuration of an information processing device 1 according to an outline of an embodiment.

First, prior to the detailed description of the embodiment, the outline of the embodiment will be described. FIG. 1 is a block diagram showing an exemplary configuration of an information processing device 1 according to an outline of an embodiment of the present invention. The information processing device 1 includes a storage unit 2, a control unit 3, and a usage data determination unit 4.

The storage unit 2 includes a memory area 5_1 (first memory area) in which data 6_1 (first data) is stored, a memory area 5_2 (second memory area) in which data 6_2 (second data) is stored, and a memory area 5_3 (third memory area) in which a valid instruction flag 7 is stored. The storage unit 2 is, for example, a flash memory, but may be another type of storage device. The valid instruction flag 7 is a flag indicating which of the data 6_1 and the data 6_2 is valid. Therefore, when the predetermined value is normally stored as the valid instruction flag 7, valid data can be specified based on the value of the valid instruction flag 7. The valid instruction flag 7 may be referred to as a flag indicating which of the memory area 5_1 and 5_2 is a valid area. In this case, it can be said that the data stored in the area designated as the valid area among the data 6_1 and the data 6_2 is valid data.

The control unit 3 controls erase and writing to the storage unit 2. Here, when the control unit 3 receives an erase instruction or a write instruction for updating the memory contents of the memory area 5_1, 5_2, and 5_3, the memory processing of the update status flag is performed. Specifically, the control unit 3 stores in the storage unit 2 the update status flag 8_1 (the first update status flag) representing the update status of the data 6_1, the update status flag 8_2 (the second update status flag) representing the update status of the data 6_2, and the update status flag 8_3 (the third update status flag) representing the update status of the valid indication flag 7. The storage destinations of the update status flags 8_1, 8_2, and 8_3 may be any of the memory area 5_1, 5_2, and 5_3, or they may be other area. For example, when the storage unit 2 is a flash memory, the control unit 3 stores the update status flag 8_1 in the memory area 5_2, stores the update status flag 8_2 in the memory area 5_1, and stores the update status flag 8_3 in the memory area 5_1 or the memory area 5_2.

The usage data determination unit 4 determines which of the data 6_1 and the data 6_2 is valid, and determines the data to be used. More specifically, the usage data determination unit 4 sets the data determined to be valid as data to be used. When the determination based on the valid instruction flag 7 is possible, the usage data determination unit 4 determines which of the data 6_1 and the data 6_2 is valid based on the value of the valid instruction flag 7. The case where the determination based on the valid instruction flag 7 is possible is, for example, a case where the write state of the valid instruction flag 7 satisfies a predetermined condition. Here, the predetermined condition is a condition for guaranteeing that the value of the valid instruction flag 7 is normal, and for example, the value of the valid instruction flag 7 may be a predetermined value (i.e., a predetermined first value indicating that the data 6_1 is valid or a predetermined second value indicating that the data 6_2 is valid). For example, when the storage unit 2 stores a flag indicating completion of writing of the valid instruction flag 7, the predetermined condition may be that the value of the valid instruction flag 7 is a predetermined value and the writing completion flag has been written.

On the other hand, when the determination based on the valid instruction flag 7 is impossible, that is, when the write state of the valid instruction flag 7 does not satisfy the predetermined condition, the usage data determination unit 4 determines which of the data 6_1 and the data 6_2 is valid based on the values of the update status flags 8_1, 8_2, and 8_3. In this case, specifically, the usage data determination unit 4 determines which of the data 6_1 and the data 6_2 is valid by checking which of the reference patterns the pattern of the values of the update status flags 8_1, 8_2, and 8_3 matches. The reference pattern is a predefined pattern, and is a pattern of values of the update status flags 8_1, 8_2, and 8_3 when the data 6_1 is determined to be valid, or a pattern of values of the update status flags 8_1, 8_2, and 8_3 when the data 6_2 is determined to be valid. For example, when the pattern of the values of the update status flags 8_1, 8_2, and 8_3 stored in the storage unit 2 matches the reference pattern for determining that the data 6_1 is valid, the usage data determination unit 4 determines that the data 6_1 is valid. Further, for example, when the pattern of the values of the update status flags 8_1, 8_2, and 8_3 stored in the storage unit 2 matches the reference pattern for determining that the data 6_2 is valid, the usage data determination unit 4 determines that the data 6_2 is valid.

When the patterns of the values of the update status flags 8_1, 8_2, and 8_3 stored in the storage unit 2 do not coincide with any of the reference patterns for determining that the data 6_1 is valid, the usage data determination unit 4 may determine that the data 6_2 is valid. Similarly, when the patterns of the values of the update status flags 8_1, 8_2, and 8_3 stored in the storage unit 2 do not coincide with any of the reference patterns for determining that the data 6_2 is valid, the usage data determination unit 4 may determine that the data 6_1 is valid. As described above, in the information processing device 1, when the determination based on the valid instruction flag 7 is not possible, valid data (valid memory area) can be uniquely determined based on the values of the updated state flags 8_1, 8_2, and 8_3. Therefore, according to the information processing device 1, valid data can be specified even if data updating processing is interrupted.

First Embodiment

Figure 2:
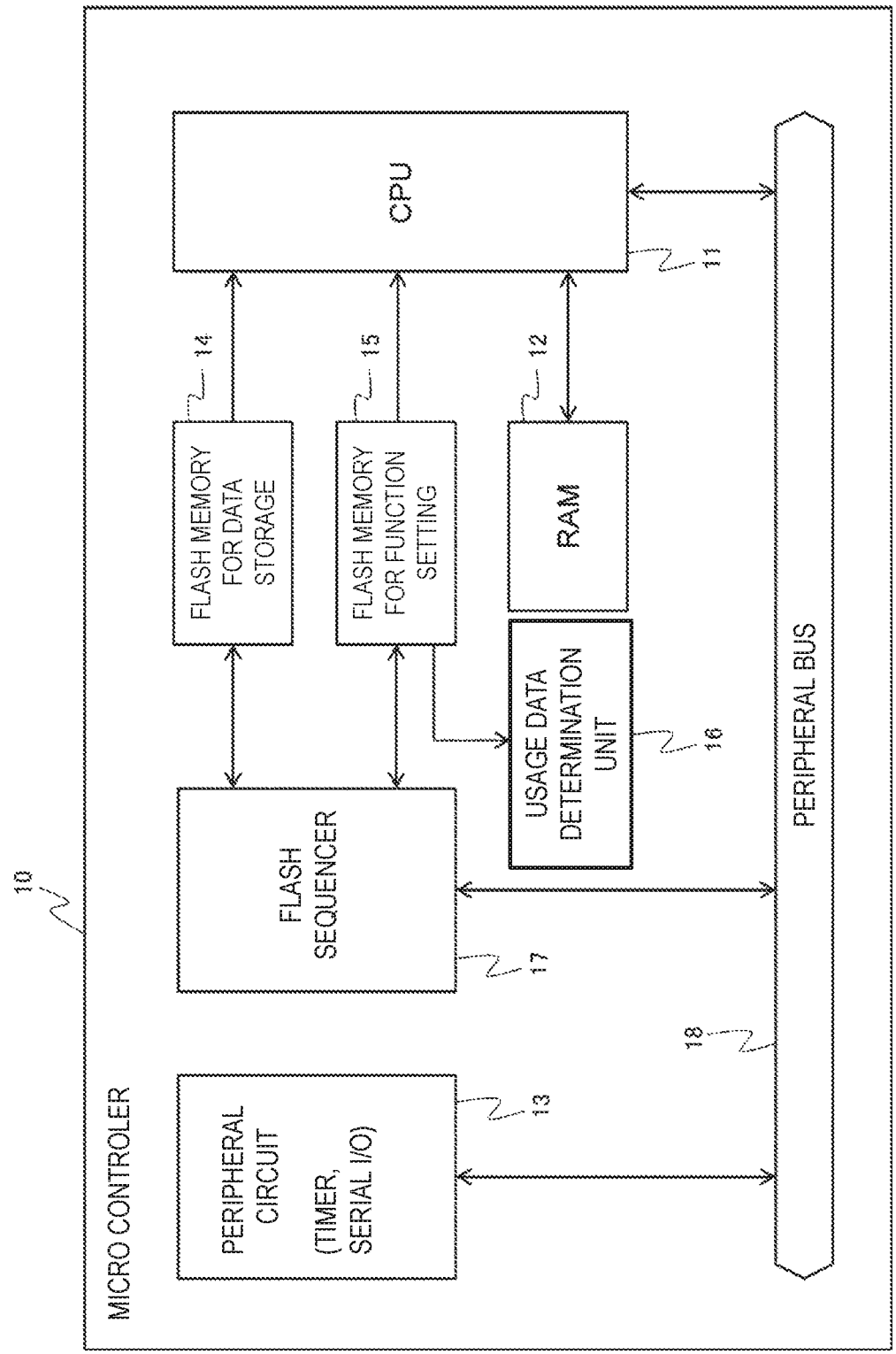
FIG. 2 is a block diagram showing an example of a configuration of a microcontroller 10 according to an embodiment.

FIG. 2 is a block diagram showing an example of the configuration of the microcontroller 10 according to the embodiment. The microcontroller 10 corresponds to the information processing device 1 of FIG. 1. As shown in FIG. 2, the microcontroller 10 includes a CPU (Central Processing Unit) 11, a RAM (Random Access Memory) 12, peripheral circuit 13, a flash memory for data storage 14, a flash memory for function setting 15, a usage data determination unit 16, a flash sequencer 17, and peripheral bus 18. The peripheral bus 18 is a bus to which the CPU 11, the flash sequencer 17, and the peripheral circuit 13 are connected.

The CPU 11 executes a process based on the data stored in the flash memory for data storage 14. That is, the data stored in the flash memory for data storage 14 includes program for causing the CPU 11 to execute a process for realizing the function of the microcontroller 10. The CPU 11 may be executed after the program stored in the flash memory for data storage 14 are loaded into the RAM12.

The RAM12 is a volatile memory in which data used by the CPU 11 is stored. The data stored in the RAM12 includes, for example, data under arithmetic operation when the CPU 11 is executing program. As described above, the program loaded from the flash memory for data storage 14 may be stored.

The peripheral circuit 13 is, for example, a timer, a serial I/O, or the like. The CPU 11 executes the process by arbitrarily using the peripheral circuit 13. The flash memory for data. storage 14 is a nonvolatile memory in which data used by the CPU 11 is stored.

Figure 3:
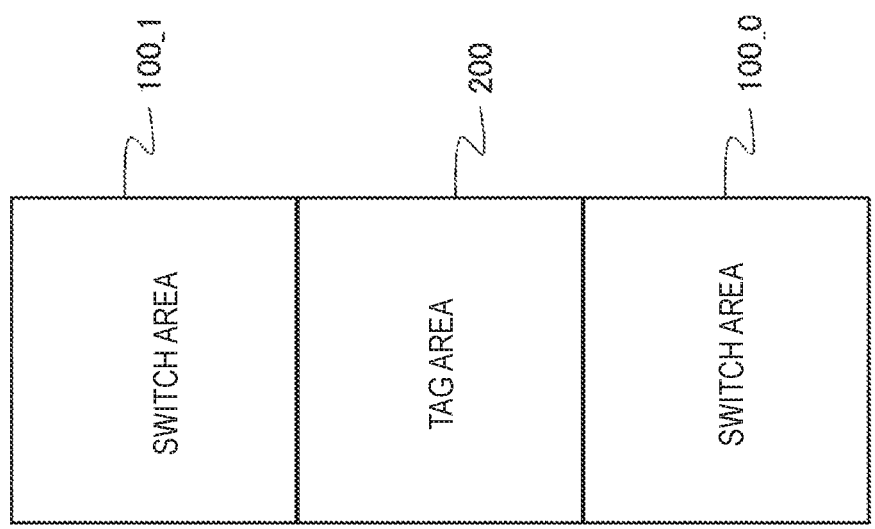
FIG. 3 is a schematic diagram showing an example of three memory area arranged in a flash memory for function setting 15.

The flash memory for function setting 15 corresponds to the storage unit 2 in FIG. 1. The flash memory for function setting 15 is a nonvolatile memory in which data used for function setting of the microcontroller 10 is stored. FIG. 3 is a schematic diagram showing an example of three memory area arranged in the flash memory for function setting 15. As shown in FIG. 3, the flash memory for function setting 15 includes a switch area 100_0, a switch area 100_1, and a tag area 200 as memory area. In the following description, the switch area 100_0 and the switch area 100_1 are referred to as a switch area 100 when they are referred to without any particular distinction. The switch area 100_0 corresponds to the memory area 5_1 in FIG. 1. The switch area 100_1 corresponds to the memory area 5_2 in FIG. 1. The tag area 200 corresponds to the memory area 5_3 of FIG. 1. Since the flash memory for function setting 15 is a flash memory, it is necessary to write new data after erase the data once in order to update or rewrite the stored data.

Figure 4:
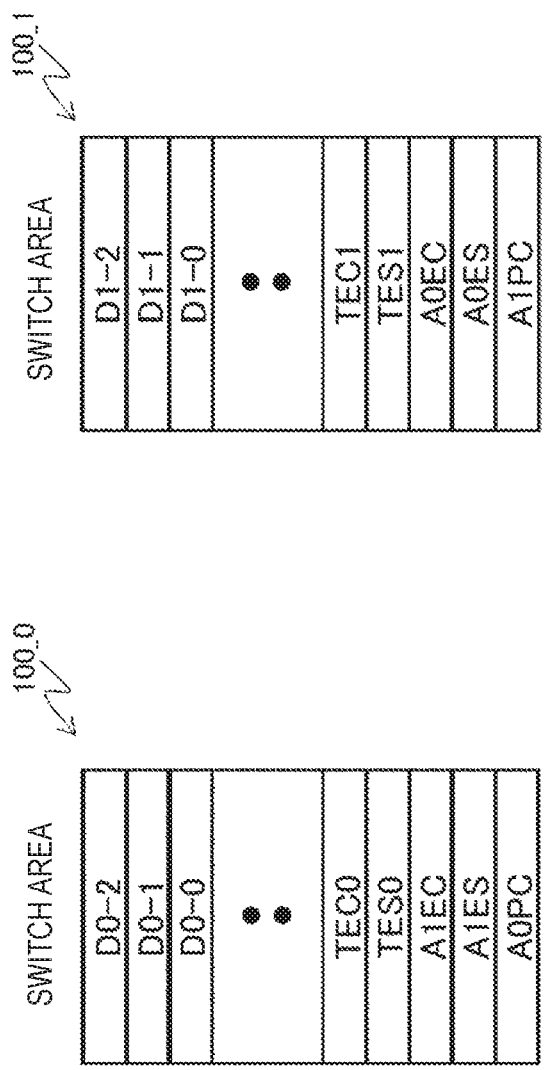
FIG. 4 is a schematic view showing an example of a configuration of a switch area 100.

FIG. 4 is a schematic diagram showing an example of the configuration of the two switches area 100_0 and 100_1. As shown in FIG. 4, setting data D0-0, setting data D0-1, and setting data D0-2, a write completion flag A0PC, an erase starting flag A1ES, an erase completion flag A1EC, an erase starting flag TES0, and an erase completion flag TEC0 are stored in the switch area 100_0. Similarly, the switch area 100_1 stores the setting data D1-0, the setting data D1-1, and the setting data D1-2, the writing completion flag A1PC, the erase starting flag A0ES, the erase completion flag A0EC, the erase starting flag TES1, and the erase completion flag TEC1.

The setting data D0-0, the setting data D0-1, and the setting data D0-2 of the switch area 100_0 correspond to the data 6_1 in FIG. 1. The setting data D1-0, the setting data D1-1, and the setting data D1-2 of the switch area 100_1 correspond to the data 6_2 of FIG. 1. Here, the setting data D0-0, the data D0-1, the data D0-2, the data D1-0, the data D1-1, and the data D1-2 are data for setting the function of the micro-controller 10. For example, these setting data may be data specifying a memory area to be accessed at the time of system starting up, data for setting a security function, or the like. In the present embodiment, the switch area 100_0 and 100_1 each store three pieces of setting data, but the number of pieces of data to be stored is not limited to three, and the number of pieces of data may be more than or less than three.

The write completion flag A0PC is a flag indicating whether or not writing of all of the setting data D0-0, the setting data D0-1, and the setting data D0-2 has been completed. Similarly, the write completion flag A1PC is a flag indicating whether or not writing of all of the setting data D1-0, the setting data D1-1, and the setting data D1-2 has been completed. More specifically, the write completion flag A0PC is a flag that is set to predetermined values when the write process performed for updating the setting data D0-0, the setting data D0-1, and the setting data D0-2 in the switch area 100_0 is completed. Similarly, the write completion flag A1PC is a flag that is set to predetermined values when the write process performed for updating the setting data D1-0, the setting data D1-1, and the setting data D1-2 in the switch area 100_1 is completed. That is, when the write completion flags A0PC and A1PC are in the erase status, it means that the writing of the setting data is not completed.

The erase starting flag A1ES is a flag indicating whether or not the erase process of the switch area 100_1 has started. Similarly, the erase starting flag A0ES is a flag indicating whether or not the erase process of the switch area 100_0 has started. More specifically, the erase starting flag A1ES is a flag that is set to predetermined values when the erase process performed for updating the setting data D1-0, the setting data D1-1, and the setting data D1-2 in the switch area 100_1 is started. Similarly, the erase starting flag A0ES is a flag that is set to predetermined values when the erase process performed for updating the setting data D0-0, the setting data D0-1, and the setting data D0-2 in the switch area 100_0 is started. That is, when the erase starting flag A1ES is in the erase state, it means that the erase processing of the switch area 100_1 is not started, and when the A0ES is in the erase state, it means that the erase processing of the switch area 100_0 is not started.

The erase completion flag A1EC is a flag indicating whether or not the erase process of the switch area 100_1 has been completed. Similarly, the erase completion flag A0EC is a flag indicating whether or not the erase process of the switch area 100_0 has been completed. More specifically, the erase completion flag A1EC is a flag that is set to predetermined values when the erase process performed for updating the setting data D1-0, the setting data D1-1, and the setting data D1-2 in the switch area 100_1 is completed. Similarly, the erase completion flag A0EC is a flag that is set to predetermined values when the erase process performed for updating the setting data D0-0, the setting data D0-1, and the setting data D0-2 in the switch area 100_0 is completed. That is, when the erase completion flag A1EC is in the erase state, it means that the erase processing of the switch area 100_1 is not completed, and when the A0EC is in the erase state, it means that the erase processing of the switch area 100_0 is not completed.

The erase starting flags TES0 and TES1 are flags indicating whether or not the erase process of the tag area 200 has started. More specifically, the erase starting flag TES0, TES1, is a flag set to a predetermined value when the erase process performed for updating the valid switch area flag VAF (see FIG. 5) in the tag area 200 starting. That is, when the erase starting flags TES0 and TES1 are in the erase state, it means that the erase process of the tag area 200 is not started.

The erase completion flags TEC0 and TEC1 are flags indicating whether or not the erase process of the tag area 200 has been completed. More specifically, the erase completion flag TEC0 and TEC1 are flags set to a predetermined value upon completion of the erase process performed for updating the valid switch area flag VAF (see FIG. 5) in the tag area 200. That is, when the erase completion flags TEC0 and TEC1 are in the erase status, it means that the erase process of the tag area 200 is not completed.

Figure 5:
FIG. 5 is a schematic diagram showing an example of a configuration of a tag area 200.

FIG. 5 is a schematic diagram showing an example of the configuration of the tag area 200. As shown in FIG. 5, a valid switch area flag VAF and a write completion flag VAPC are stored in the tag area 200.

The valid switch area flag VAF is a flag indicating which of the switch area 100_0 and the switch area 100_1 is an effective area. That is, the valid switch area flag VAF is flag indicating which area of the switch area 100_0 and the switch area 100_1 the setting data stored therein is valid data. The valid switch area flag VAF corresponds to the valid instruction flag 7 in FIG. 1.

The write completion flag VAPC is a flag indicating whether or not writing of the valid switch area flag VAF has been completed. More specifically, the write completion flag VAPC is a flag that is set to a predetermined value when the write process performed for updating the valid switch area flag VAF in the tag area 200 is completed. That is, when the write completion flag VAPC is erased, it means that the writing of the valid switch area flag VAF has not been completed.

The usage data determination unit 16 corresponds to the usage data determination unit 4 of FIG. 1, and is a circuit that determines which of the switch area 100_0 and 100_1 is an effective area and determines data to be used by the microcontroller 10. In other words, the usage data determination unit 16 determines which area of the switch area 100_0 and the switch area 100_1 the setting data stored therein is valid data, and the data determined to be valid is used by the microcontroller 10. A specific determination method in the usage data determination unit 16 will be described later.

The usage data determination unit 16 determines data to be used by any component of the microcontroller 10 at a predetermined timing, for example, at the time of resetting the microcontroller 10. The usage data determination unit 16 may read out the data determined to be used from the flash memory for function setting 15 and transmit the data to a register or the like that can be accessed by a component that uses the data or a component that uses the data.

The flash sequencer 17 is a circuit for controlling an erase process and a write process to the flash memory for data storage and the flash memory for function setting 15. The flash sequencer 17 corresponds to the control unit 3 in FIG. 1. In the present embodiment, write processing and erase processing of CPU 11 to the data-storing flash memory 14 and the flash memory for function setting 15 are performed via the flash sequencer 17. The CPU 11 may read data from the flash memory for data storage 14 and the flash memory for function setting 15 via the flash sequencer 17, or may read data directly without the flash sequencer 17.

The flash sequencer 17 incorporates an address designation register in which address data for designating which address is to be erased or written to the flash memory for data storage 14 or the flash memory for function setting 15 is stored. Address data transmitted from the CPU 11 is stored in the address specifying register. The flash sequencer 17 also includes a command specifying register in which a command for instructing an erase process or a writing process is stored. The command specifying register stores data transmitted from the CPU 11 as write data to the flash sequencer 17.

The CPU 11 writes the write data to the flash sequencer 17 in a predetermined order via the peripheral buses 18, thereby specifying the control content to be executed by the flash sequencer 17. The flash sequencer 17 performs control corresponding to the write data written in the command designation register with respect to the address indicated by the address data written in the address designation register of the flash sequencer 17.

Here, a command of the flash sequencer 17 will be described with reference to FIG. 6 as a specific example. As shown in FIG. 6, a "switch area erase" command, a "switch area write" command, a "tag area erase" command, and a "tag area update" command are prepared as commands for controlling the flash sequencer 17.

When the CPU 11 erases the switch area 100_0 or the switch area 100_1, it uses the "switch area erase" command. More specifically, the CPU 11 sequentially writes command data (H'87 and H'D0) in the command specifying register of the flash sequencer 17, for example. Here, H' means that the following numerical value is in hexadecimal notation. Upon receipt of the "switch area erase" command, the flash sequencer 17 deletes the currently disabled area of the switch area 100_0 and the switch area 100_1. A specific flow of the erase process of the switch area 100 will be described later with reference to FIG. 7.

When writing data to the switch area 100_0 or the switch area 100_1, the CPU 11 uses a "write switch area" command. More specifically, the CPU 11 sequentially writes command data (e.g., H'85, H'08, WD0, WD1, WD2, and H'D0) into the command specifying register of the flash sequencer 17. Here, the WD0, the WD1, and the WD2 are setting data to be newly written. That is, the WD0, the WD1, and the WD2 are new setting data D0-0, the D0-1, the D0-2, or new setting data D1-0, the D1-1, and the D1-2. When the flash sequencer 17 receives the "Write switch area" command, the WD0, WD1, and WD2 are written to the currently invalid area of the switch area 100_0 and the switch area 100_1 as new setting data. A specific flow of the writing process of the switch area 100 will be described later with reference to FIG. 8.

The CPU 11 also uses the "tag area erase" commands to erase the tag area 200. More specifically, the CPU 11 sequentially writes command data (H'89 and H'D0) in the command specifying register of the flash sequencer 17, for example. The flash sequencer 17 erases the tag area 200 upon receipt of the "tag area erase" command. A specific flow of the writing process of the tag area 200 will be described later with reference to FIG. 9.

When updating the tag area 200, that is, when switching the valid switch area flag VAF, the CPU 11 uses the "tag area update" command. More specifically, the CPU 11 sequentially writes command data (H'83 and H'D0) in the command specifying register of the flash sequencer 17, for example. Upon receiving the "tag area update" command, the flash sequencer 17 updates the value of the valid switch area flag VAF. A specific flow of the update processing of the tag area 200 will be described later with reference to FIG. 10.

Next, the operation of the microcontroller 10 will be described with reference to the drawings. As described below, when a command is received, the flash sequencer 17 determines which of the switch area 100_0 and the switch area 100_1 is effective in the same manner as the usage data determination unit 16. In the present embodiment, each of the flash sequencer 17 and the usage data determination unit 16 has the same determination function, but one of them may have a determination function, and the other may use one of the determination functions. The flash sequencer 17 and the usage data determination unit 16 may be configured by a single control circuit.

Figure 7:
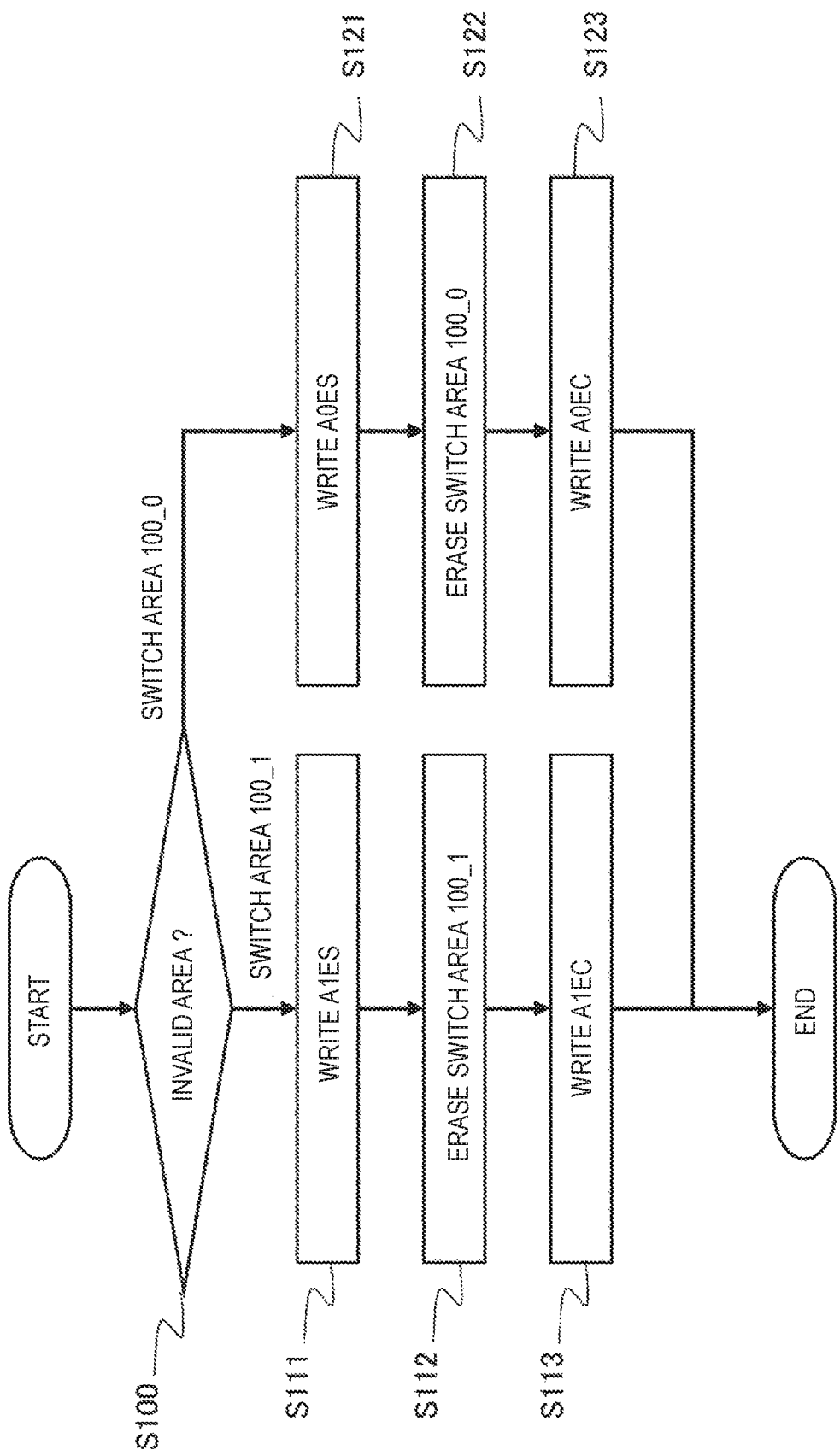
FIG. 7 is a flow chart showing an exemplary operation of the flash sequencer 17 according to the first embodiment when a "switch area erase" command is received.

FIG. 7 is a flowchart showing an example of the operation of the flash sequencer 17 when the "switch area erase" command is received. When the flash sequencer 17 receives the "switch area erase" command, it executes erase of the invalid switch area 100 and writing of the erase starting flag corresponding to the erase and the erase completion flag. Hereinafter, the flow of the operation of the flash sequencer 17 when the "switch area erase" command is received will be described with reference to FIG. 7.

In Step 100 (S100), the flash sequencer 17 determines which of the switch area 100_0 and the switch area 100_1 is an invalid area, that is, which area is not an invalid area. The flash sequencer 17 refers to the flag stored in the switch area 100_0, the flag stored in the switch area 100_1, and the flag stored in the tag area 200, and determines whether the switch area 100_0 or the switch area 100_1 is an invalid area. In order to reflect the contents of the setting data in the operation of the microcontroller 10, when the flags read from the switch area 100_0, the switch area 100_1, and the tag area 200 at the time of starting the microcontroller 10 are stored in a register (not shown), the flash sequencer 17 may determine the invalid area by referring to the value of the register (not the flag stored in the flash memory for function setting 15). This also applies to the usage data determination unit 16. A specific determination method will be described later with reference to FIG. 12.

When the invalid area is the switch area 100_1, in Step 111 (S111), the flash sequencer 17 writes a predetermined value indicating the starting of erase as the erase starting flag A1ES in the switch area 100_0. Next, in Step 112 (S112), the flash sequencer 17 erases the switch area 100_0. Next, in Step 113 (S113), the flash sequencer 17 writes a predetermined value indicating the completion of erase as the erase completion flag A1EC in the switch area 100_0.

Similarly, when the invalid area is the switch area 100_0, in Step 121 (S121), the flash sequencer 17 writes a predetermined value indicating the starting of erase as the erase starting flag A0ES in the switch area 100_1. Next, at Step 122 (S122), the flash sequencer 17 erases the switch area 100_0. Next, in Step 123 (S123), the flash sequencer 17 writes a predetermined value indicating the completion of the erase into the switch area 100_1 as the erase completion flag A0EC.

Figure 8:
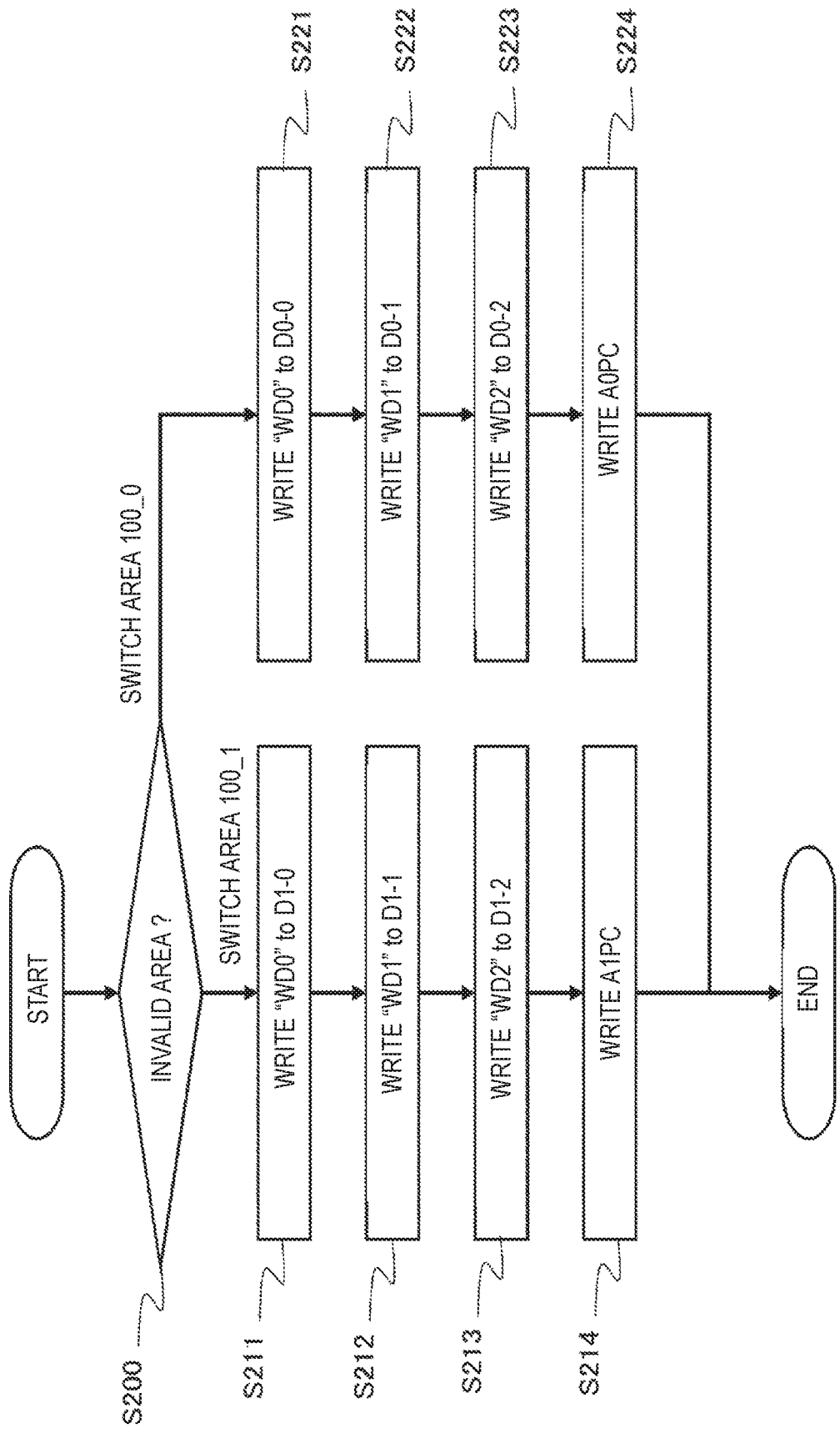
FIG. 8 is a flowchart showing an example of the operation of the flash sequencer 17 when a "switch area write" command is received.

FIG. 8 is a flowchart showing an example of the operation of the flash sequencer 17 when the "switch area write" command is received. When the flash sequencer 17 receives the "switch area write" command, the flash sequencer 17 performs writing of the WD0, the WD1, and the WD2 to the invalid switch area 100 and writing of the write completion flag for the switch area 100. Hereinafter, the flow of the operation of the flash sequencer 17 when the "switch area write" command is received will be described with reference to FIG. 8.

In Step 200 (S200), as in S100 of FIG. 7, the flash sequencer 17 determines which of the switch area 100_0 and the switch area 100_1 is an invalid area, that is, which area is not a valid area.

When the invalid area is the switch area 100_1, in Step 211 (S211), the flash sequencer 17 writes the WD0 received from the CPU 11 as the setting data D1-0 of the switch area 100_1. Next, in Step 212 (S212), the flash sequencer 17 writes the WD1 received from the CPU 11 as the setting data D1-1 of the switch area 100_1. Next, in Step 213 (S213), the flash sequencer 17 writes the WD2 received from the CPU 11 as the setting data D1-2 of the switch area 100_1. Next, at Step 214 (S214), the flash sequencer 17 writes a predetermined value indicating the completion of writing as the writing completion flag A1PC in the switch area 100_1.

Similarly, when the invalid area is the switch area 100_0, in Step 221 (S221), the flash sequencer 17 writes the WD0 received from the CPU 11 as the setting data D0-0 of the switch area 100_0. Next, in Step 222 (S222), the flash sequencer 17 writes the WD1 received from the CPU 11 as the setting data D0-1 of the switch area 100_0. Next, in Step 223 (S223), the flash sequencer 17 writes the WD2 received from the CPU 11 as the setting data D0-2 of the switch area 100_0. Next, in Step 224 (S224), the flash sequencer 17 writes a predetermined value indicating the completion of writing as the writing completion flag A0PC in the switch area 100_0.

Figure 9:
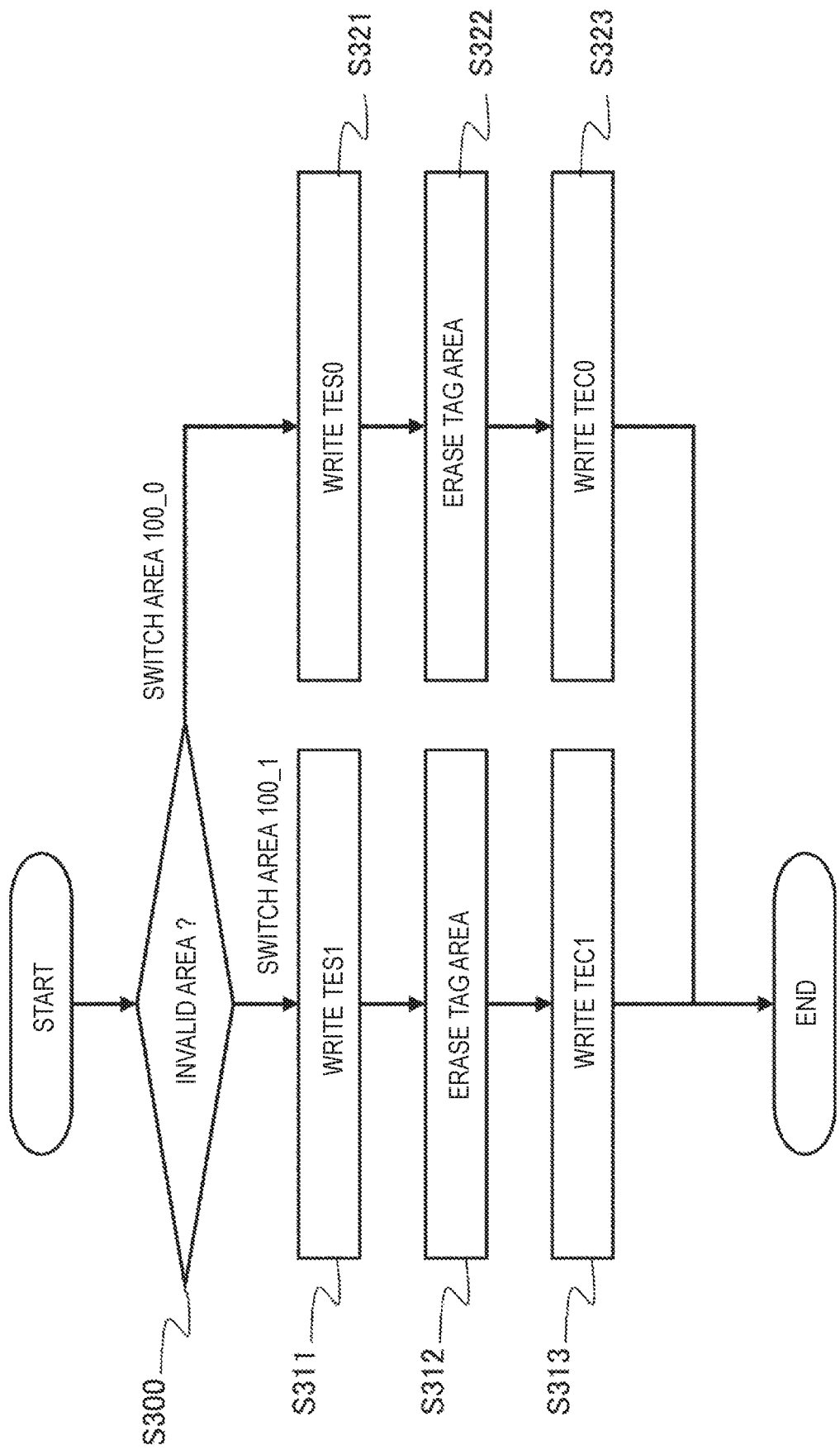
FIG. 9 is a flow chart showing an exemplary operation of the flash sequencer 17 according to the first embodiment when a "tag area erase" command is received.

FIG. 9 is a flowchart showing an example of the operation of the flash sequencer 17 when the "tag area erase" command is received. When the flash sequencer 17 receives the "tag area erase" command, it executes erase of the tag area 200 and writing of the erase starting flag and erase completion flag of the tag area 200. In present embodiment, the flash sequencer 17 writes the erase starting flag and the erase completion flag in the tag area 200 in the invalid switch area 100. Hereinafter, the flow of the operation of the flash sequencer 17 when the "tag area erase" command is received will be described with reference to FIG. 9.

In Step 300 (S300), as in S100 of FIG. 7, the flash sequencer 17 determines which of the switch area 100_0 and the switch area 100_1 is an invalid area, that is, which area is not an effective area.

When the invalid area is the switch area 100_1, the flash sequencer 17 writes a predetermined value indicating the starting of erase as the erase starting flag TES1 in the switch area 100_1 in Step 311 (S311). Next, in Step 312 (S312), the flash sequencer 17 erases the tag area 200. Next, in Step 313 (S313), the flash sequencer 17 writes a predetermined value indicating the completion of erase as the erase completion flag TEC1 in the switch area 100_1. Similarly, when the invalid area is the switch area 100_0, the flash sequencer 17 writes a predetermined value indicating the starting of erase as the erase starting flag TES0 in the switch area 100_0 in Step 321 (S321). Next, in Step 322 (S322), the flash sequencer 17 erases the tag area 200. Next, in Step 323 (S323), the flash sequencer 17 writes a predetermined value indicating the completion of the erase into the switch area 100_0 as the erase completion flag TEC0.

Figure 10:
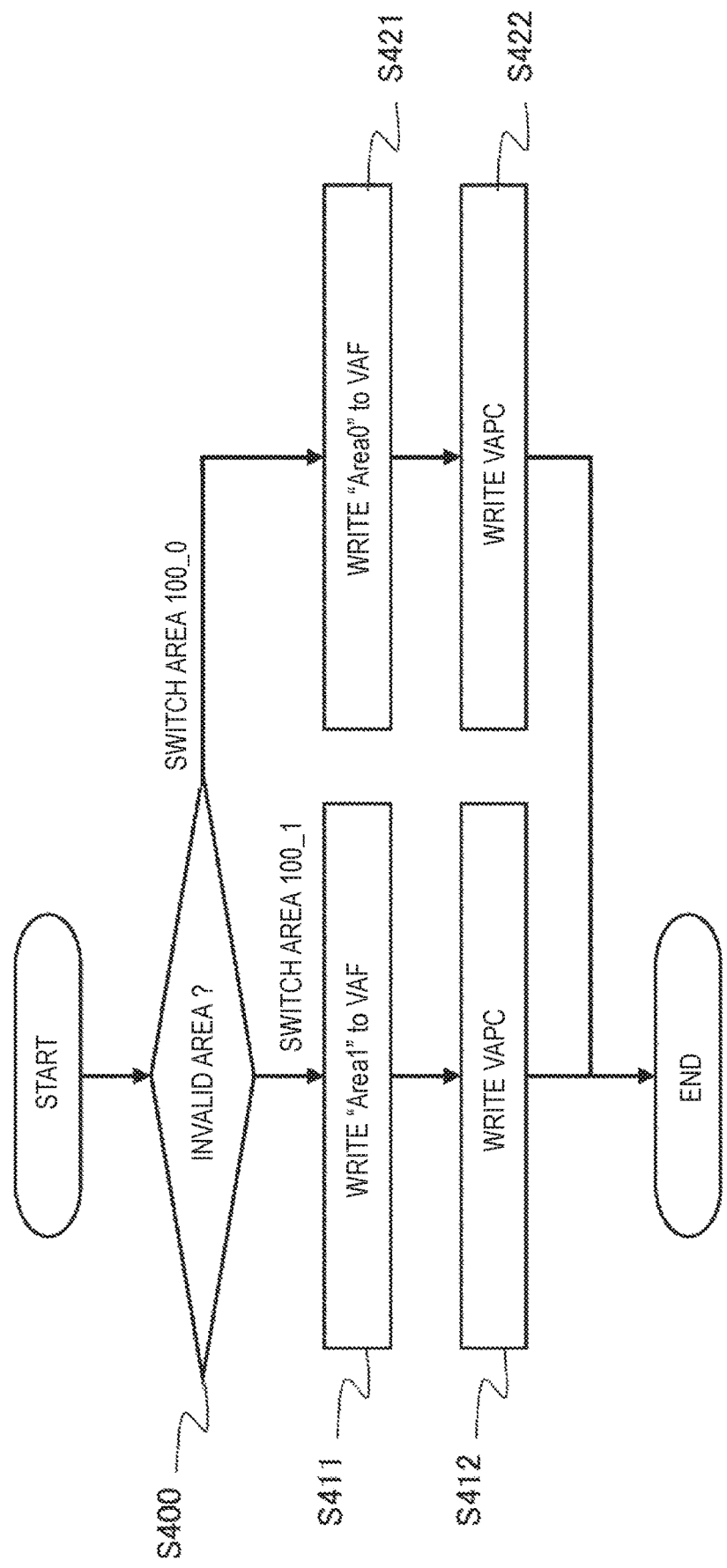
FIG. 10 is a flow chart showing an example of the operation of the flash sequencer 17 according to the first embodiment when a "tag area update" command is received.

FIG. 10 is a flowchart showing an example of the operation of the flash sequencer 17 when the "tag area update" command is received. Upon receipt of the "tag area update" command, the flash sequencer 17 writes to the tag area 200 a set value indicating the next enabled area (i.e., the current disabled area) as the valid switch area flag VAF. Thereafter, the flash sequencer 17 writes the write completion flag VAPC. Hereinafter, the flow of the operation of the flash sequencer 17 when the "tag area update" command is received will be described with reference to FIG. 10.

In Step 400 (S400), as in S100 of FIG. 7, the flash sequencer 17 determines which of the switch area 100_0 and the switch area 100_1 is an invalid area, that is, which area is not an effective area.

When the invalid area is the switch area 100_1, the flash sequencer 17 writes a set value "Area1" indicating that the switch area 100_1 is a valid area in the tag area 200 as the valid switch area flag VAF in Step 411 (S411). Next, at Step 412 (S412), the flash sequencer 17 writes a predetermined value indicating the completion of writing as the writing completion flag VAPC in the tag area 200.

Similarly, when the invalid area is the switch area 100_0, the flash sequencer 17 writes a set value "Area0" indicating that the switch area 100_0 is a valid area in the tag area 200 as the valid switch area flag VAF in Step 421 (S421). Next, in Step 422 (S422), the flash sequencer 17 writes a predetermined value indicating the completion of writing as the write completion flag VAPC in the tag area 200.

When updating the flash memory for function setting 15, the CPU 11 executes four commands, for example, a "switch area erase" command, a "switch area write" command, a "tag area erase" command, and a "tag area update" command in this order in accordance with a program (software) for updating the setting data. As a result, the setting data used by the microcontroller 10 is updated.

FIGS. 11A, 11B, and 11C show an example of each value when four commands are executed in the order described above. However, in this embodiment, the transition of the values when the valid setting data is switched from the D100, the D110, and the D120 stored as the setting data D1-0, the D1-1, and the D1-2 of the switch area 100_1 to the D001, the D011, and the D021 newly stored as the setting data D0-0, the D0-1, and the D0-2 of the switch area 100_0 is shown. FIG. 11A is a table showing transition of each setting data and each flag in the switch area 100_0. FIG. 11B is a table showing transition of each setting data and each flag in the switch area 100_1. FIG. 11C is a table showing the transition of flags in the tag area 200. In each of the flags shown in FIGS. 11A, 11B, and 11C, "E" indicates an erased state, "P" indicates a state in which a value is written, and "X" indicates an arbitrary state. In addition, a thick frame line in the table indicates a value changed from the value of the previous step in order to facilitate understanding. These notations are the same in FIG. 12, FIG. 22A, and FIG. 22B.

As shown in FIG. 11A, when the four commands are executed in the above-described order, the setting data and the flag are erased in the switch area 100_0, after which new setting data is written, and further, the writing completion flag A0PC of the setting data is written. Thereafter, at the time of erase the tag area 200, writing of the erase starting flag TES0 and writing of the erase completion flag TEC0 are performed.

On the other hand, in the switch area 100_1, as shown in FIG. 11B, when the switch area 100_0 is erased, writing of the erase starting flag A0ES and writing of the erase completion flag A0EC are performed. In the tag area 200, as shown in FIG. 11C, after the valid switch area flag VAF and the write completion flag VAPC are erased, the setting value "Area0" indicating that the switch area 100_0 is an effective area is written as the value of the valid switch area flag VAF, and further, writing to the write completion flag VAPC is performed.

As described above, when the updating process is executed without interruption, the tag area 200 holds "Area0" or "Area1" as the value of the valid switch area flag VAF, and holds a predetermined value indicating completion of writing as the value of the writing completion flag VAPC. However, when the process is interrupted, for example, during updating of the tag area 200 due to various factors including, for example, instantaneous interruption of the power supply of the microcontroller 10, the value of the valid switch area flag VAF or the value of the write completion flag VAPC becomes indefinite. In present embodiment, even when such interruptions occur, the following determination is made so as to uniquely determine the valid switch area 100.

When the determination based on the valid switch area flag VAF is possible, the flash sequencer 17 and the usage data determination unit 16 determine which of the switch area 100_0 and the switch area 100_1 is a valid area based on the value of the valid switch area flag VAF. In present embodiment, when the value of the valid switch area flag VAF is "Area0" or "Area1" and the write completion flag VAPC is not in the erased state, the flash sequencer 17 and the usage data determination unit 16 can make a determination based on the valid switch area flag VAF.

On the other hand, when the determination based on the valid switch area flag VAF is impossible, the flash sequencer 17 and the usage data determination unit 16 determine which of the switch area 100_0 and the switch area 100_1 is the valid area in accordance with the pattern of the combination of the values of the current flag. That is, when the value of the valid switch area flag VAF is neither "Area0" nor "Area1", or when the write completion flag VAPC is in the erased status, the flash sequencer 17 and the usage data determination unit 16 determine a valid area in accordance with the patterns of combinations of the values of the present flags. More specifically, the flash sequencer 17 and the usage data determination unit 16 confirm which of the predefined reference patterns corresponds to the pattern of the combination of the values of the current flag, and determine that the area previously associated with the corresponding reference pattern is a valid area. In the determination of the invalid area in S100 (see FIG. 7), S200 (see FIG. 8), S300 (see FIG. 9), and S400 (see FIG. 10), the area on the side other than the switch area 100 determined to be valid in the determination of the valid area may be set as the invalid area.

An example of the determination by the flash sequencer 17 and the usage data determination unit 16 will be described with reference to FIG. 12. FIG. 12 is a table showing an example of a reference pattern. The reference pattern is stored in, for example, the flash sequencer 17 and the usage data determination unit 16, but may be stored in any other component in the microcontroller 10.

In the present embodiment, the flash sequencer 17 and the usage data determination unit 16 use the erase starting flag A1ES, the erase completion flag A1EC, the erase starting flag TES0, the erase completion flag TEC0, the erase starting flag A0ES, the erase completion flag A0EC, the erase starting flag TES1, the erase completion flag TEC1, the valid switch area flag VAF and the write completion flag VAPC of the tag area 200 in order to determine the valid switch area 100.

As shown in the table of FIG. 12, when the write completion flag VAPC of the tag area 200 is in the write state "P" and the set value of the valid switch area flag VAF is "Area0" or "Area1" (corresponding to the states (A) and (E) of FIG. 12), the flash sequencer 17 and the usage data determination unit 16 determine the valid switch area 100 in accordance with the set value of the valid switch area flag VAF.

When the set value of the valid switch area flag VAF is not "Area0" or "Area1" or when the write completion flag VAPC is in the erase state "E" (corresponding to states (B), (C), (D), (F), (G), and (H) in FIG. 12), the flash sequencer 17 and the usage data determination unit 16 determine the valid switch area 100 in accordance with the patterns of the erase starting flag A0ES, the A1ES, the TES0, the TES1, and the erase completion flags A0EC, the A1EC, the TEC0, and the TEC1. That is, the erase starting flag A0ES and the erase completion flag A0EC are examples of the updating status flag 8_1 in FIG. 1. The erase starting flag A1ES and the erase completion flag A1EC are examples of the updated status flag 8_2 in FIG. 1. Further, the erase starting flags TES0 and TES1, and the erase completion flags TEC0 and TEC1 are examples of the updating status flag 8_3 in FIG. 1.

The states (B), (C), and (D) in FIG. 12 correspond to the S2 and S3 of the tag area erase and the S1 of the tag area updating in FIGS. 11A, 11B, and 11C, and show the patterns of flags generated when the updating process is interrupted due to the power supply instantaneous interruption or the like during the switching of the valid area from the switch area 100_1 to the switch area 100_0. In the case of these states, since the area switching processing has not been completed completely, the switch area 100_1 is determined not to be the switch area 100_0 but to be the effective area similarly, the states (F), (G), and (H) in FIG. 12 indicate patterns of flags generated when the update processing is interrupted due to power supply instantaneous interruption or the like during switching of the effective area from the switch area 100_0 to the switch area 100_1. Also in these states, since the area switching processing is not completed completely, the switch area 100_0 is determined as the effective area instead of the switch area 100_1.

For example, the microcontroller 10 stores advance a reference pattern associated with the switch area 100 to be an effective area, and the flash sequencer 17 and the usage data determination unit 16 refer to the reference pattern and confirm which reference pattern the flag pattern matches, thereby specifying the effective area. In the example shown in FIG. 12, the flag patterns of the states (A), (B), (C), and (D) are reference patterns for determining the switch area 100_1 as an effective area, and "switch area 100_1" is associated with these patterns. Similarly, the flag patterns of the states (E), (F), (G), and (H) are reference patterns for determining the switch area 100_0 as an effective area, and "switch area 100_0" is associated with these patterns.

The determination logic shown in FIG. 12 is an example. A reference pattern other than the reference pattern shown in FIG. 12 may be used as the determination logic when it is impossible to determine the effective area based on the value of the valid switch area flag VAF. Alternatively, other rules may be used to associate any switch area 100 with each reference pattern. For example, in the example shown in FIG. 12, when the valid area cannot be determined by the values of the valid switch area flags VAF, the patterns of eight flags (the erase starting flags A1ES, the A0ES, the TES0, and the TES1, and the erase completion flags A1EC, the A0EC, the TEC0, and the TEC1) are used, but the valid area may be determined by the patterns of some of these flags. Alternatively, the write completion flags A0PC and A1PC may be used as reference patterns.

The reference pattern may include a pattern in which the state of the flag changes with time. When a power supply instantaneous interruption occurs during the flag writing process, the writing state becomes insufficient for retention. Thus, such a flag may change over time to an erased state. Therefore, in consideration of such a case, the valid area may be determined using not only the patterns of flags (reference patterns shown in states (B), (C), (D), (F), (G), and (H) of FIG. 12) generated when the processing is interrupted during the erase or updating of the tag area 200, but also the patterns in which some of the flags are changed over time to the erase state in these patterns.

In the present embodiment, the erase starting flag and the erase completion flag at the time of erase the tag area 200 are written in the invalid switch area 100, but the erase starting flag and the erase completion flag may be written in the valid switch area 100. That is, when the invalid area is the switch area 100_1, writing of the erase starting flag TES0 and the erase completion flag TEC0 of the switch area 100_0 may be performed, and when the invalid area is the switch area 100_0, writing of the erase starting flag TES1 and the erase completion flag TEC1 of the switch area 100_1 may be performed.

When the logical compression is possible in the combination of the values of the flags, the number of flags used as the reference pattern may be decreased. For example, in the example shown in FIG. 12, since the values of the erase starting flags TES0 and TES1 are the same in the states (B), (C), (D), (F), (G), and (H), the determination may be performed without using these flags.

As described above, the microcontroller 10 can uniquely specify the valid switch area 100 based on the states of the other flags even when the determination based on the value of the valid switch area flag VAF cannot be performed. Therefore, even when the processing is interrupted during the update of the valid switch area flag VAF and the valid switch area flag VAF becomes an uncertain value, the effective area can be determined. That is, valid setting data can be specified.

Second Embodiment

According to the first embodiment, even when the effective area cannot be specified by the valid switch area flag VAF of the tag area 200, the effective area can be specified by the flag patterns of the switch area 100_0 and the switch area 100_1. However, in order to confirm the flag pattern, it is necessary that both the switch area 100_0 and the switch area 100_1 are not in the erased state. That is, if the invalid switch area 100 is erased in a state where the valid area cannot be specified by the valid switch area flag VAF the valid area cannot be correctly determined. If the valid switch area flag VAF is updated before the setting data is written to the invalid switch area 100, the switch area 100 is determined to be a valid area even though the setting data is not written. For example, when the command is executed in the order of the "switch area erase" command, the "tag area erase" command, and the "tag area update" command, that is, when the update of the flash memory for function setting 15 is executed by an incorrect procedure in which the "switch area write" command is not executed, the determination of the effective area cannot be correctly performed. As described above, in the above-described effective area determination method, when the tag area 200 and the switch area 100_0 are simultaneously erased, or when the tag area 200 and the switch area 100_1 are simultaneously erased, there is a possibility that the effective area cannot be correctly determined. Therefore, in the present embodiment, the flash sequencer 17 erases the memory area only when a predetermined condition is satisfied.

Figure 13:
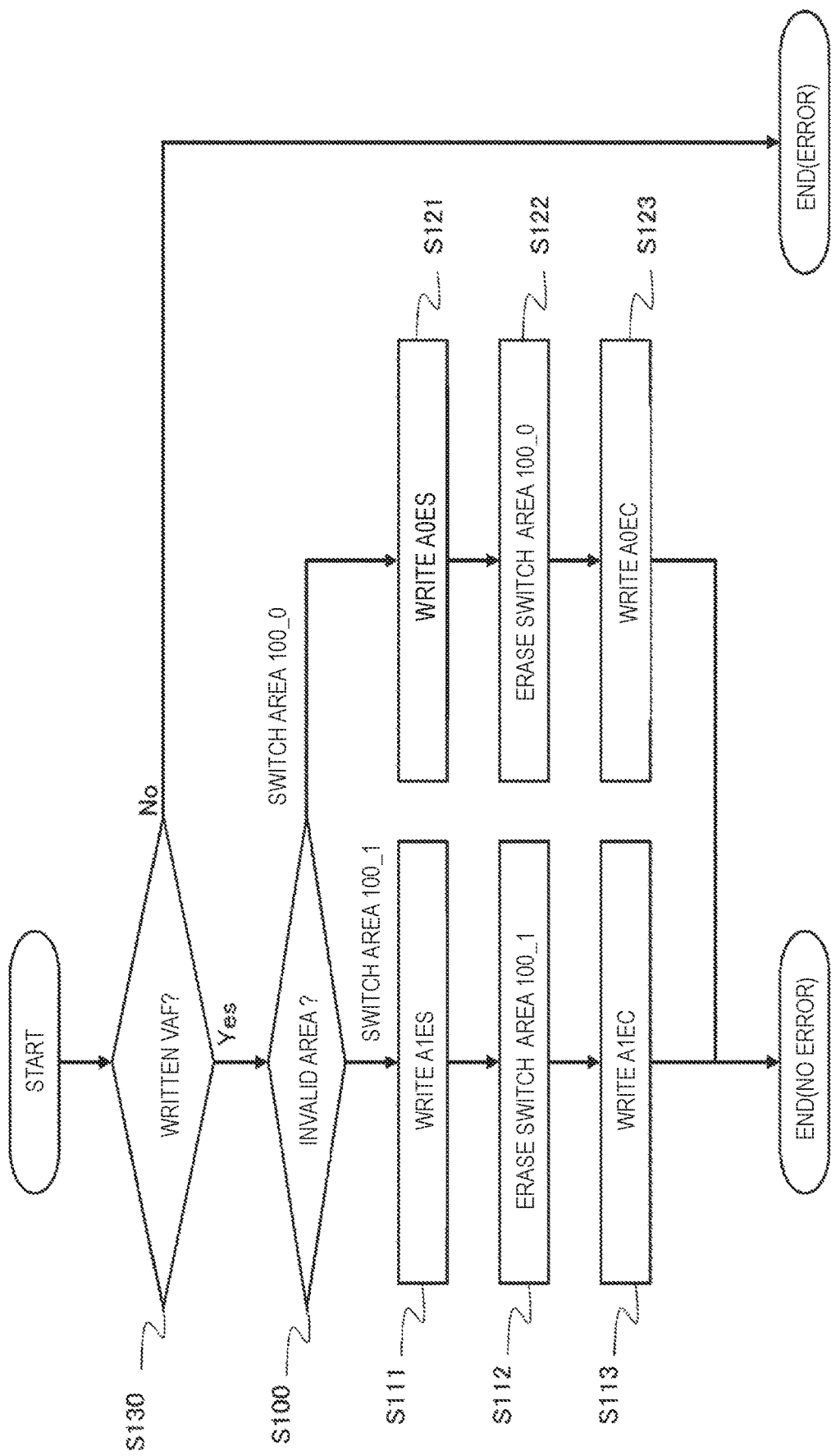
FIG. 13 is a flow chart showing an exemplary operation of the flash sequencer 17 according to the second embodiment when a "switch area erase" command is received.

FIG. 13 is a flow chart showing an exemplary operation of the flush sequencer 17 according to the second embodiment when the "switch area erase" command is received. The flowchart of FIG. 13 differs from the flowchart of first embodiment (FIG. 7) in that a step (S130) of determining whether or not the valid switch area flag VAF of the tag area 200 has been written has been added prior to the determination (S100) of the invalid area.

That is, in second embodiment, when the flash sequencer 17 receives the "switch area erase" command, in S130, it determines whether the valid switch area flag VAF of the tag area 200 has been written. When the valid switch area flag VAF has been written (Yes in S130), the process proceeds to S100, and the same process as the process shown in FIG. 7 is performed. On the other hand, if the valid switch area flag VAF has not been written (No in S130), the process ends in error. That is, in this case, the switch area is not erased.

For example, the flash sequencer 17 refers to the valid switch area flag VAF, determines that the valid switch area flag VAF has been written when it is not in the erased state (i.e., when all bits are 1, for example), and determines that the valid switch area flag VAF has not been written when it is in the erased state. The flash sequencer 17 may determine that the valid switch area flag VAF has been written when the value of the valid switch area flag VAF is "Area0" or "Area1", and may determine that the valid switch area flag VAF has not been written when the value of the valid switch area flag VAF is neither "Area0" nor "Area1".

Figure 14:
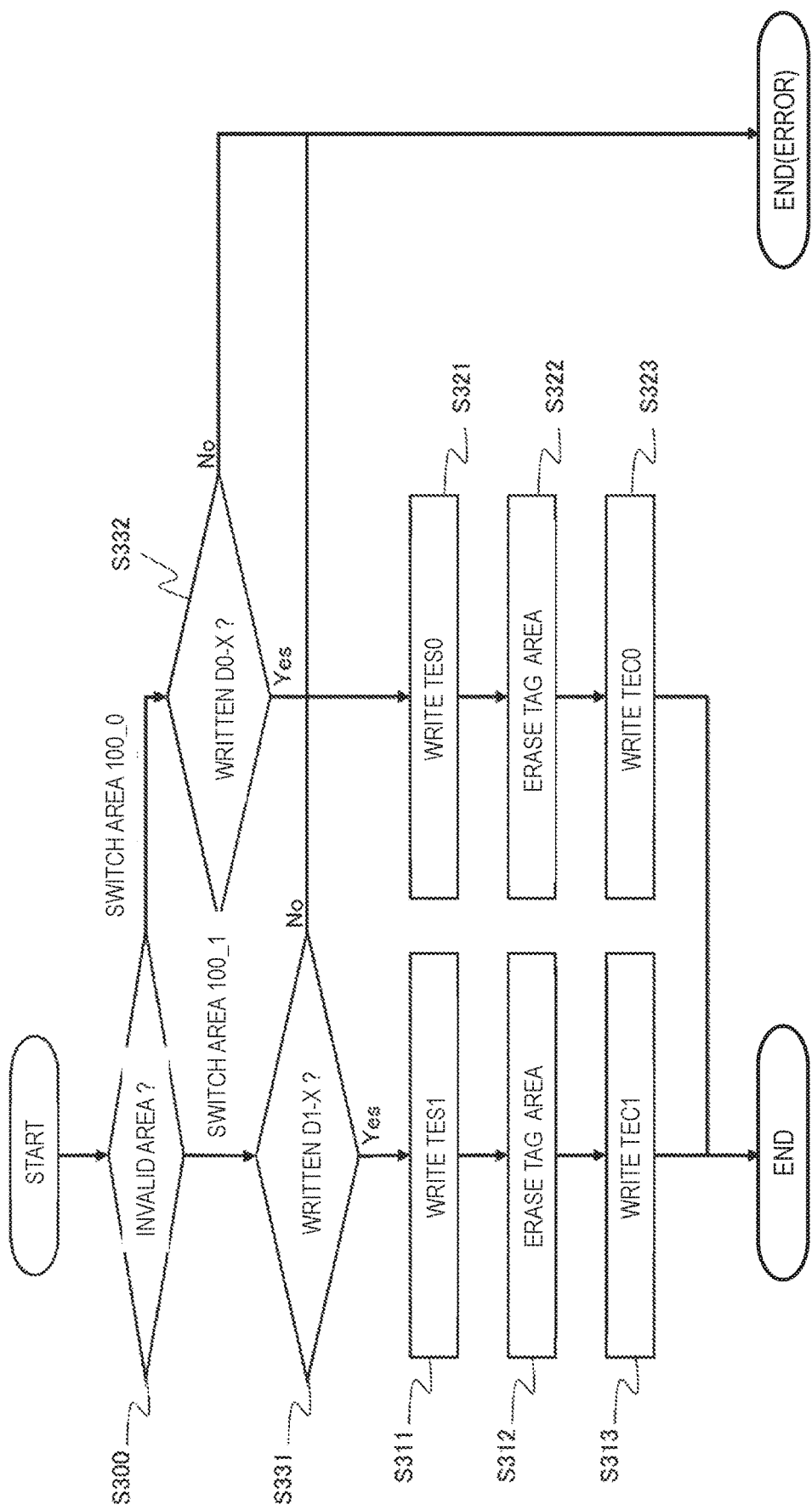
FIG. 14 is a flow chart showing an exemplary operation of the flash sequencer 17 according to the second embodiment when a "tag area erase" command is received.

As described above, in the second embodiment, the flash sequencer 17 erases the switch area 100_0 or the switch area 100_1 only when the valid switch area flag VAF is stored in the tag area 200. Therefore, it is possible to prevent the erase of the switch area 100 from being started in a state in which the valid switch area flag VAF has not been written. Therefore, it is possible to improve the reliability of the determination of the valid area as compared with first embodiment. FIG. 14 is a flow chart showing an exemplary operation of the flush sequencer 17 according to the second embodiment when the "tag-area erase" command is received. The flowchart of FIG. 14 differs from the flowchart of first embodiment (FIG. 9) in that after the determination of the invalid area (S300), a step of determining whether or not the setting data of the invalid area has been written (Steps 331 and 332) is added.

That is, in second embodiment, when the invalid area is the switch area 100_1, the process proceeds to Step 331 (S331) after S300. In S331, the flash sequencer 17 determines whether all the setting data of the switch area 100_1, i.e., the setting data D1-0, the setting data D1-1, and the setting data D1-2, have been written. For example, the flash sequencer 17 refers to the setting data, determines that the setting data has been written when the setting data is not in the erased state (i.e., when all bits are 1), and determines that the setting data has not been written when the setting data is in the erased state. When all the setting data of the switch area 100_1 has been written (Yes in S331), the process proceeds to S311, and the same process as the process shown in FIG. 9 is performed. On the other hand, if any setting data of the switch area 100_1 has not been written (No in S331), the process ends in error. That is, in this case, the tag area 200 is not erased.

Similarly, in second embodiment, if the invalid area is the switch area 100_0, the process proceeds to Step 332 (S332) after S300. In S332, the flash sequencer 17 determines whether all the setting data of the switch area 100_0, i.e., the setting data D0-0, the setting data D0-1, and the setting data D0-2, have been written. When all the setting data of the switch area 100_0 has been written (Yes in S332), the process proceeds to S321, and the same process as the process shown in FIG. 9 is performed.

On the other hand, if any setting data of the switch area 100_0 has not been written (No in S332), the process ends in error. That is, in this case, the tag area 200 is not erased.

That is, in the second embodiment, the flash sequencer 17 erases the tag area 200 only when the currently valid area is the switch area 100_0, in other words, when the currently valid data is the setting data of the switch area 100_0, and when the setting data is stored in the switch area 100_1. The flash sequencer 17 erases the tag area 200 only when the currently valid area is the switch area 100_1, in other words, when the currently valid data is the setting data of the switch area 100_1, and when the setting data is stored in the switch area 100_0. Therefore, it is possible to prevent the erase of the tag area 200 from being started in a state in which the setting data has not been written. Therefore, it is possible to improve the reliability of the determination of the valid area as compared with first embodiment.

Incidentally, in the processing shown in FIG. 13, the valid switch area flag VAF is used when determining whether or not the tag area 200 has been written, and in the processing shown in FIG. 14, the setting data D0-0, the D0-1, the D0-2, or the setting data D1-0, the D1-1, and the D1-2 are used when determining whether or not the switch area 100 has been written. Considering the possibility that the writing state of these flags or data is insufficient retention and the value changes with time, the operation of the system may become unstable by executing the processing of FIG. 13 or FIG. 14. Therefore, as will be described below, before the execution of the process of FIG. 13 or FIG. 14, these flags and the writing completion flag written immediately after the execution of the writing of the data may be checked. When the write completion flag is in the erase state, that is, when it is not in the write state, it means that the writing of the flag or data described above is interrupted for some reason, and the processing does not proceed until the writing of the write completion flag. On the other hand, when the write completion flag is not in the erase state, that is, when it is in the write state, it means that the writing of the flag or data described above is normally completed. That is, it is guaranteed that retention is not insufficient.

Figure 15:
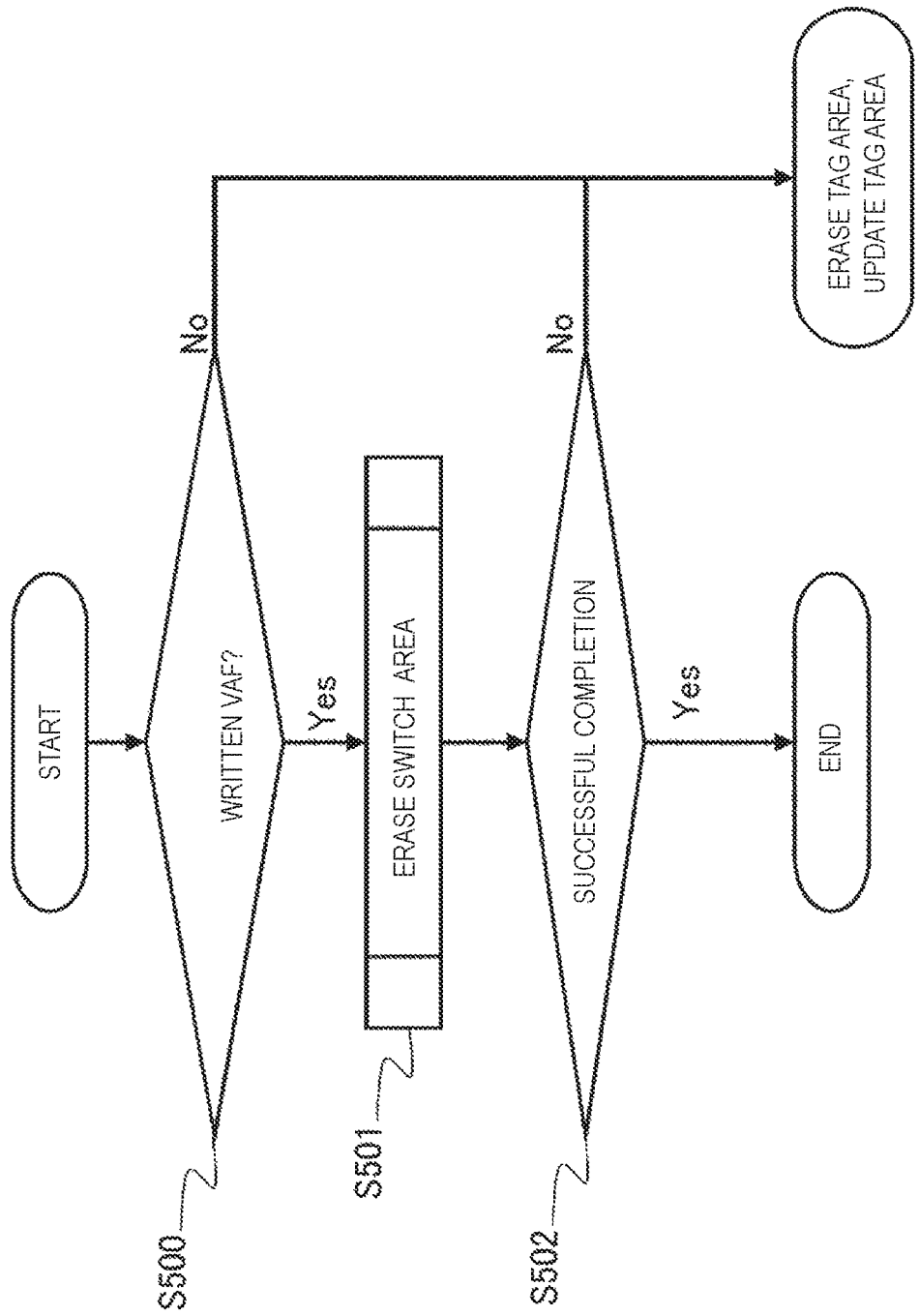
FIG. 15 is a flowchart showing a process performed prior to the process illustrated in FIG. 13.

FIG. 15 is a flowchart showing processing executed before the processing shown in FIG. 13. Here, it is assumed that the processing shown in FIG. 15 is software processing. In this instance, the CPU 11 executes the following processes by executing the program.

At Step 500 (S500), the CPU 11 determines whether the write completion flag VAPC has been written. When the write completion flag VAPC has been written, it is ensured that the valid switch area flag VAF has been written normally. That is, it is ensured that no change in the value occurs due to insufficient retention. Therefore, when the write completion flag VAPC has been written (YES in S500), the CPU 11 transmits a "switch area erase" command to the flash sequencer 17 in S501. As a result, the process shown in FIG. 13 is executed.

After S501, in S502, the CPU 11 determines whether the erase switched area command was successfully executed. When the process is completed without completing the process shown in FIG. 13, the CPU 11 determines that the "erase switched area" command has been executed normally, and ends the process.

When the process shown in FIG. 13 ends in error, that is, when it is determined in S130 that the valid switch area flag VAF has not been written, it is necessary to write the valid switch area flag VAF. If it is determined in S500 that the write completion flag VAPC has not been written (NO in S500), the writing of the valid switch area flag VAF needs to be performed normally. Therefore, in these cases, the CPU 11 erases the tag area 200 and updates the tag area 200, and writes the valid switch area flag VAF.

In this manner, the flash sequencer 17 performs erase of the switch area 100_0 or the switch area 100_1 only when the write completion flag VAPC indicates completion of writing of the valid switch area flag VAF. Therefore, the operation of the system can be stabilized.

Figure 16:
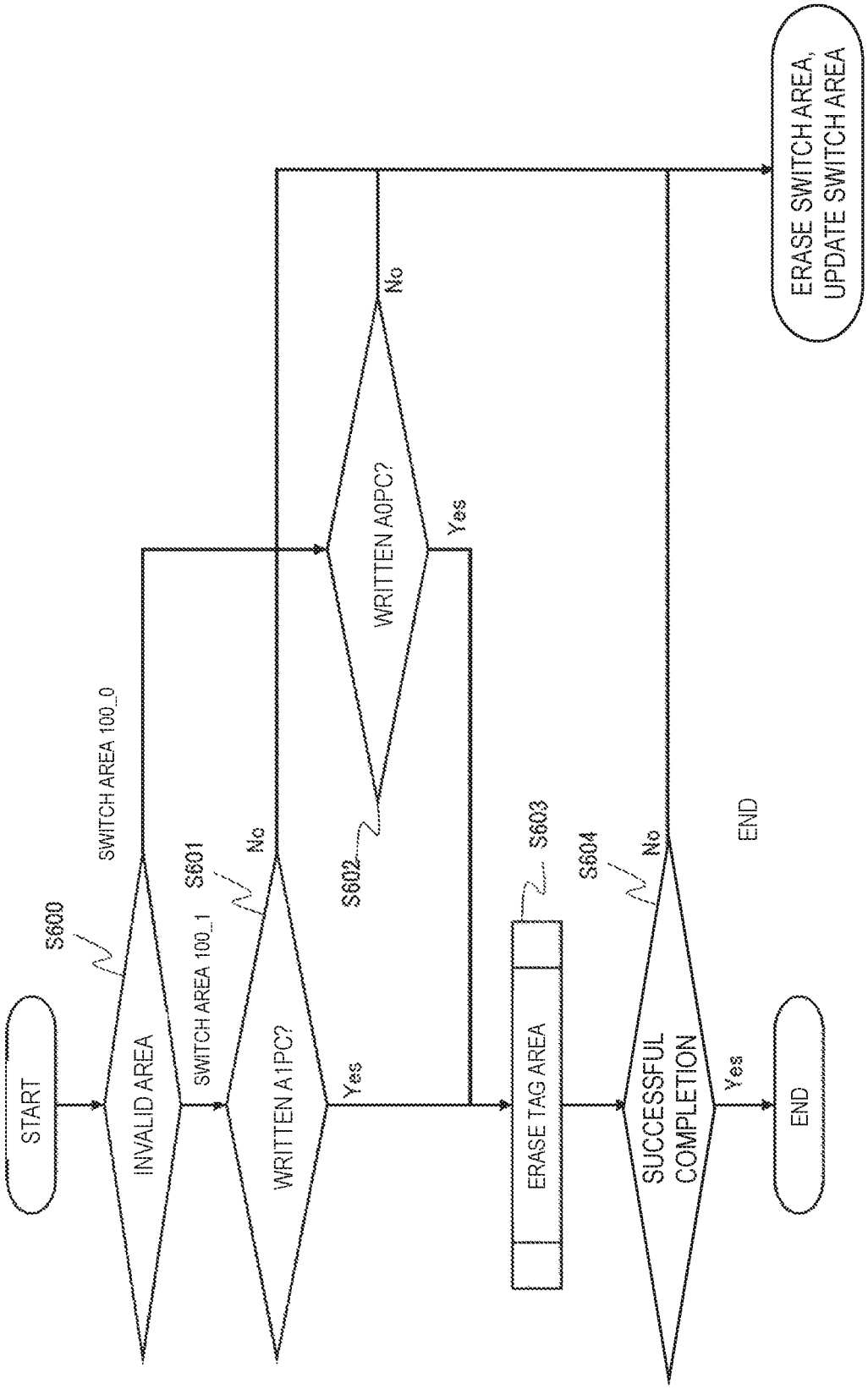
FIG. 16 is a flowchart showing a process performed prior to the process illustrated in FIG. 14.

FIG. 16 is a flowchart showing processing executed before the processing shown in FIG. 14. Here, it is assumed that the processing shown in FIG. 16 is software processing.

In this instance, the CPU 11 executes the following processes by executing the program.

In Step 600 (S600), the CPU 11 determines which of the switch area 100_0 and the switch area 100_1 is an invalid area, that is, which area is not a valid area. This determination is the same as the determination methods described in first embodiment.

When the invalid area is the switch area 100_1, the CPU 11 determines whether the write completion flag A1PC has been written in Step 601 (S601). If the invalid area is the switch area 100_0, the CPU 11 determines in Step 602 (S602) whether the write completion flag A0PC has been written. When the write completion flag A1PC is already written, it is ensured that the setting data D1-0, the setting data D1-1, and the setting data D1-2 of the switch area 100_1 are normally written. Similarly, when the write completion flag A0PC is already written, it is ensured that the setting data D0-0, the setting data D0-1, and the setting data D0-2 of the switch area 100_0 are normally written. In other words, it is ensured that the value does not change due to insufficient retention. Therefore, when the write completion flag A1PC has been written (Yes in S601) and when the write completion flag A0PC has been written (Yes in S602), the CPU 11 transmits a "tag area erase" command to the flash sequencer 17 in S603. As a result, the process shown in FIG. 14 is executed.

After S603, in S604, the CPU 11 determines whether the erase tag area command was successfully executed. When the processing is completed without completing the processing shown in FIG. 14, the CPU 11 determines that the "tag area erase" command has been executed normally, and ends the processing.

When the process shown in FIG. 14 ends in error, that is, when it is determined in S331 or S332 that the setting data has not been written, it is necessary to write the setting data. When it is determined in S601 or S602 that the write completion flag A1PC or the write completion flag A0PC has not been written (No in S601 or No in S602), the setting data needs to be written normally. Therefore, in these cases, the CPU 11 performs the process of erase the switch area and writing the switch area, and performs the write of the setting data.

In this manner, the flash sequencer 17 performs erase of the tag area 200 only when the write completion flag A0PC or the write completion flag A1PC indicates completion of writing of the setting data to be newly validated. Therefore, the operation of the system can be stabilized.

Although the confirmation of the write completion flag VAPC in the process of FIG. 15 and the confirmation of the write completion flags A0PC and A1PC in the process of FIG. 16 are performed by CPU 11, the flash sequencer 17 may perform the confirmation.

Third Embodiment

Figure 17:
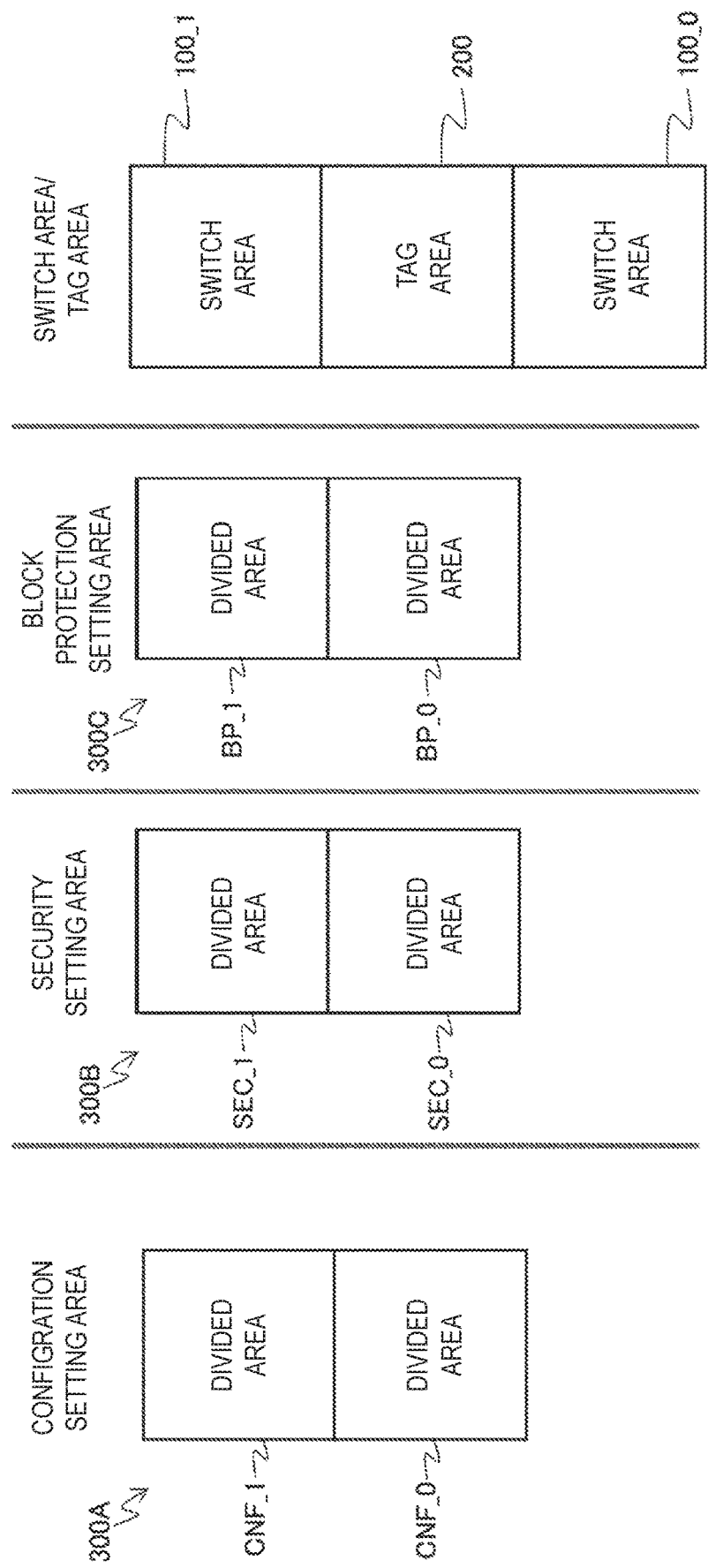
FIG. 17 is a schematic view showing an exemplary configuration of a flash memory 15 for setting a function according to a third embodiment.

FIG. 17 is a schematic diagram showing an exemplary configuration of the flash memory for function setting 15 of the third embodiment. The flash memory for function setting 15 according to the third embodiment includes, as memory area, a configuration setting area 300A, a security setting area 300B, and a block protection setting area 300C in addition to the switch area 100_0, the switch area 100_1, and the tag area 200. In first embodiment and second embodiment, data for setting the function of the micro-controller 10 is stored in the switch area 100_0 and the switch area 100_1 as setting data D0-0, a D0-1, a D0-2, a D1-0, a D1-1, and a D1-2. On the other hand, in the present embodiment, data for setting the function of the micro-controller 10 (hereinafter referred to as function setting data) is stored in the configuration setting area 300A, the security setting area 300B, and the block-protection setting area 300C. In the switch area 100_0 and the switch area 100_1, data specifying which function setting data is to be used is stored as setting data D0-0, a D0-1, a D0-2, a D1-0, a D1-1, and a D1-2.

The configuration setting area 300A is an area for storing function setting data for setting a basic function of the microcontroller 10, such as setting information for specifying a memory area to be accessed at the time of system starting up. The security setting area 300B is an area for storing function setting data for setting a security function such as an ID. The block protection setting area 300C is an area for storing function setting data for setting rewrite permission, prohibition, and the like for each block of the flash memory for data storage 14.

The configuration setting area 300A, the security setting area 300B, and the block protection setting area 300C are each composed of two areas. More specifically, the configuration setting area 300A includes a divided area CNF_0 and a divided area CNF_1. The security setting area 300E includes a divided area EC_0 and a divided area EC_1. The block protection setting area 300C includes a divided area BP_0 and a divided area BP_1. Therefore, two sets of function setting data can be stored in each of the configuration setting area 300A, the security setting area 300B, and the block protection setting area 300C. That is, it is possible to store a first set (first group) of function setting data in one divided area, and to store a second set (second group) of function setting data in the other divided area. Therefore, for example, one of these two sets can be used as the old function setting data, and the other can be used as the new function setting data.

Which of the two sets is actually used in the operation of the microcontroller 10 is determined by the setting data (i.e., the setting data D0-0, the D0-1, the D0-2, or the setting data D1-0, the D1-1, and the D1-2) stored in the valid switch area 100. That is, the function setting data of which divided area is to be used is specified by the setting data stored in the valid switch area 100.

The configuration setting area 300A, the security setting area 300B, and the block protection setting area 300C are only examples of area for setting various functions of the microcontroller 10. Therefore, the flash memory for function setting 15 is not limited to these area, and may be provided with other memory area in which function setting data for a predetermined function of the microcontroller 10 is stored. In present embodiment, the flash memory for function setting 15 includes three memory areas: the configuration setting area 300A, the security setting area 300B, and the block protection setting area 300C as memory area in which function setting data for a predetermined function of the microcontroller 10 is stored. Correspondingly, the switch area 100_0 stores three pieces of setting data D0-0, the D0-1, and the D0-2, and the switch area 100_1 also stores three pieces of setting data D1-0, the D1-1, and the D1-2. That is, the number of setting data to be stored in the switch area 100_0 and the switch area 100_1 change in accordance with the number of memory area in which the function setting data for a predetermined function of the microcontroller 10 is stored. In the following description, when the configuration setting area 300A, the security setting area 300B, and the block protection setting area 300C are referred to without distinction, they are referred to as a setting area 300.

Figure 18:
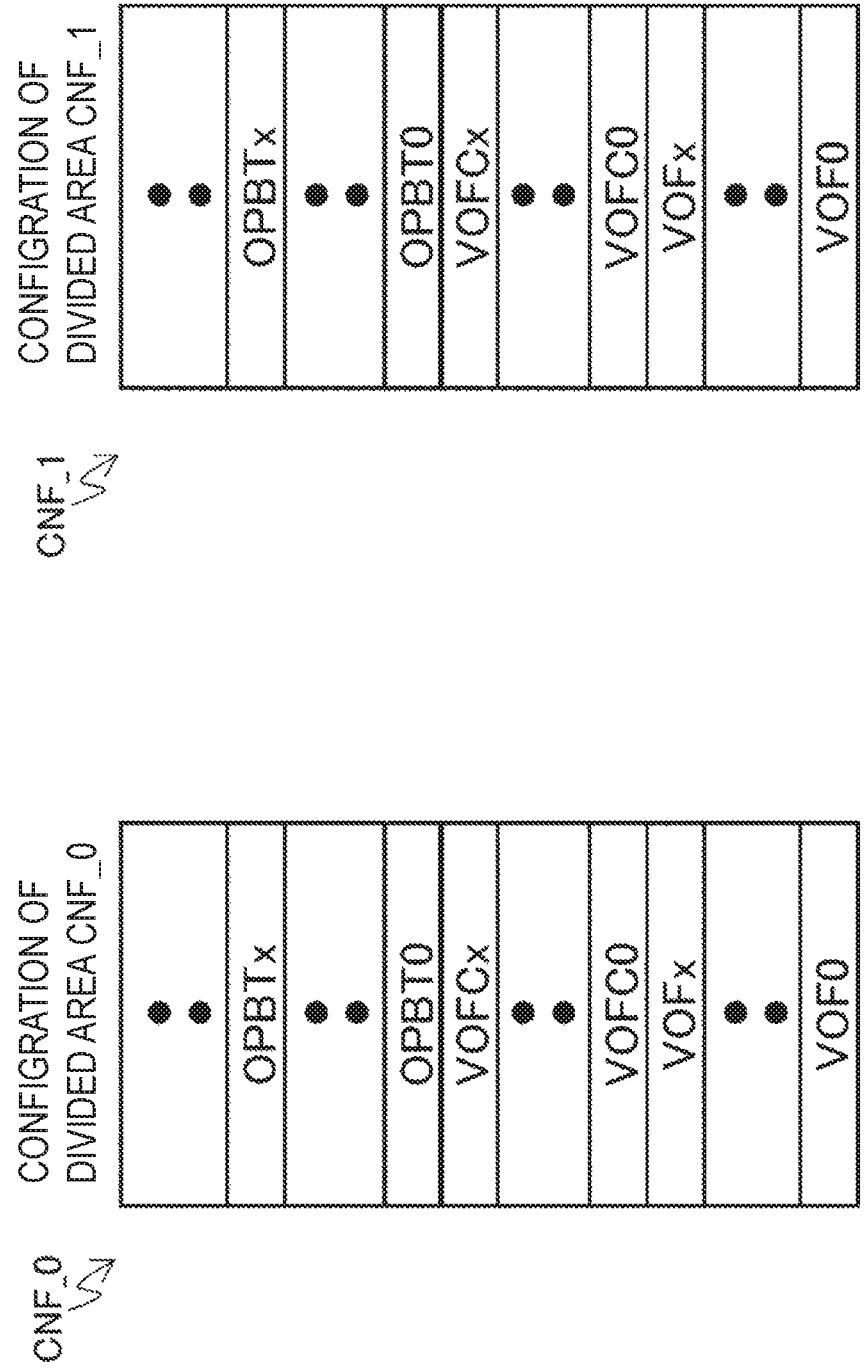
FIG. 18 is a schematic diagram showing an example of the configuration of two divided area CNF_0 and CNF_1 of a configuration setting area 300A.

FIG. 18 is a schematic diagram showing an example of the configuration of the two divided areas CNF_0 and CNF_1 of the configuration setting area 300A. The divided area CNF_0 and the divided area CNF_1 have the same configuration. As shown in FIG. 18, the divided area CNF_0 and CNF_1 store function setting data OPBT0, ..., OPRTx, which are referred to as optional bytes, a write completion flag VOF0, ..., VOFx, a write completion flag VOFC0, ..., and VOFCx.

The function setting data OPBTi (where i is an integer from 0 to x, and the same applies to the following explanation), is data for setting the function of the micro-controller 10, as described above. The write completion flag VOFi is a flag indicating whether or not the writing of the function setting data OPBTi has been completed. The write completion flag VOFCi is a flag indicating whether or not writing of the write completion flag VOFi has been completed.

The configurations of the divided area SEC_0 and SEC_1 of the security setting area 300B and the divided area BP_0 and BP_1 of the block protection setting area 300C are the same as those of the divided area CNF_0 and CNF_1 of the configuration setting area 300A. However, the number of necessary function setting data may differ from the configuration setting area 300A depending on the specification of the microcontroller 10.

In present embodiment, as in first embodiment and second embodiment, the CPU 11 writes the write data to the flash sequencer 17 in a predetermined order via the peripheral bus 18, thereby specifying the control content to be executed by the flash sequencer 17. However, in the present embodiment, the following command, for the setting area 300 are further prepared. FIG. 19 is a diagram showing commands for the setting area 300. As shown in FIG. 19, in the present embodiment, in addition to the command shown in FIG. 6, a "setting area erase" command and a "setting area write" command are prepared as commands for controlling the flash sequencer 17.

When deleting the setting area 300, the CPU 11 uses the "setting area erase" command. More specifically, the CPU 11 sequentially writes command data (H'47 and H' D0) in the command specifying register of the flash sequencer 17, for example. When receiving the "set area erase" command, the flash sequencer 17 erases the set area 300 specified by the CPU 11 among the configuration setting area 300A, the security setting area 300B, and the block protection setting area 300C. The CPU 11 designates a setting area 300 to be erased by setting values in an address designation register incorporated in the flash sequencer 17.

When data is written in the setting area 300, the CPU 11 uses a "setting area write" command. More specifically, the CPU 11 sequentially writes command data (e.g., H'45 data, H'08 data, WD0 data, WD1 data, WD2 data, WD3 data, and H'D0 data) into the command specifying register of the flash sequencer 17. Here, the WD0, the WD1, the WD2, and the WD3 are function setting data to be newly written. That is, the WD0, the WD1, the WD2, and the WD3 are new function setting data OPBTi. When the flash sequencer 17 receives the "write setting area" command, the WD0, WD1, WD2, and WD3 are written as new function setting data to the setting area 300 specified by the CPU 11 among the configuration setting area 300A, the security setting area 300B, and the block protection setting area 300C. The CPU 11 designates the write target setting area 300 by setting values in an address designation register incorporated in the flash sequencer 17.

Figure 20:
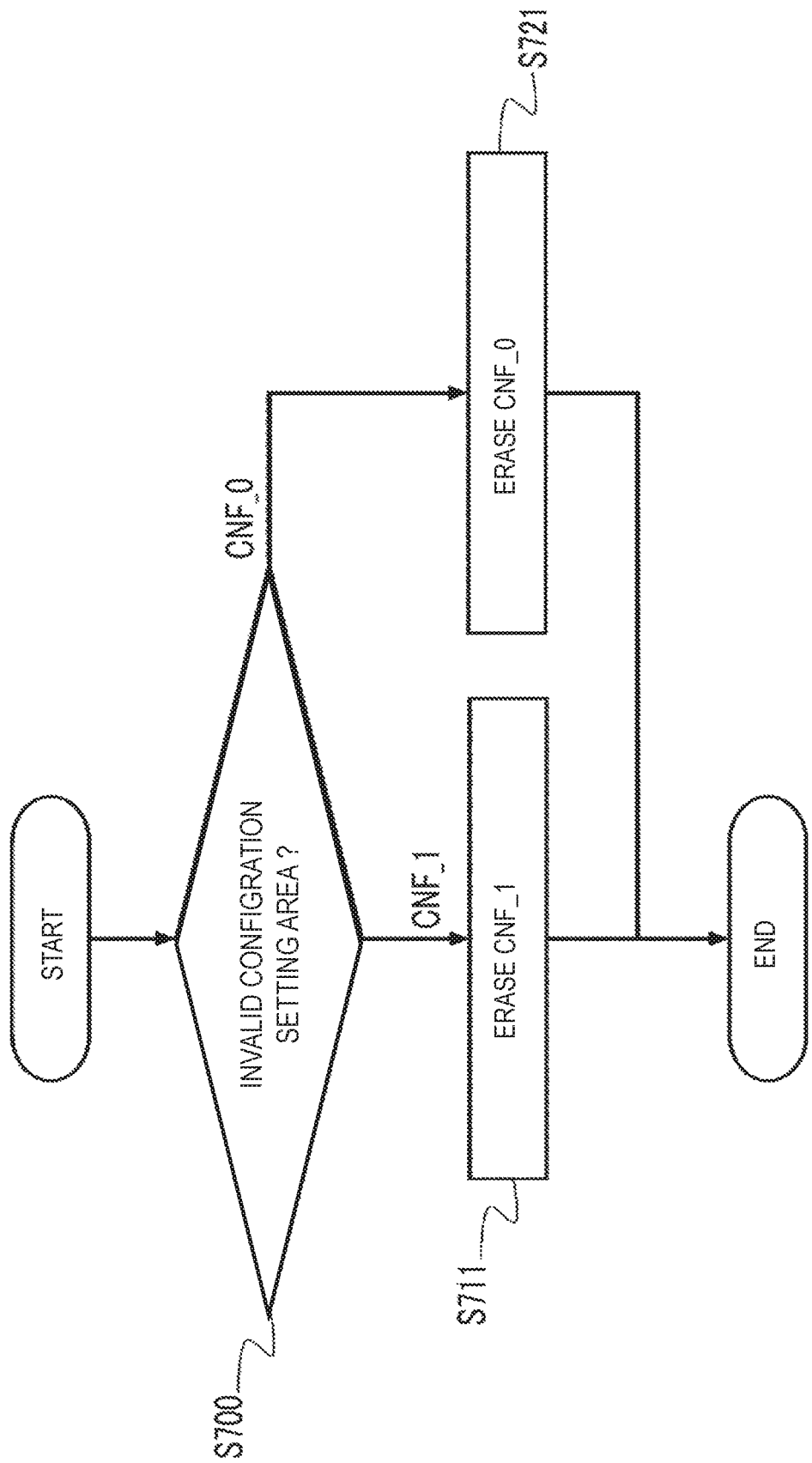
FIG. 20 is a flow chart illustrating an example of the operation of the flash sequencer 17 when a "set area erase" command is received with the address of the configuration setting area 300A set to the addressing register.

FIG. 20 is a flowchart showing an example of the operation of the flash sequencer 17 in the case where the "setting area erase" command is received in a state where the address of the configuration setting area 300A is set in the address specifying register. When the flash sequencer 17 receives the "set area erase" command, it deletes the invalid division area out of the division area of the set area 300. Hereinafter, the flow of the operation of the flash sequencer 17 in the case of receiving the "setting area erase" command will be described with reference to FIG. 20.

In Step 700 (S700), the flash sequencer 17 determines which of the divided area CNF_0 and CNF_1 is an invalid area, i.e., which area is not a valid area. Here, the effective divided area is an area in which the function setting data of the user who actually uses the divided area is stored. The invalid divided area is an area in which the function setting data which is not actually used is stored. In order to determine an invalid divided area, the flash sequencer 17 refers to the setting data stored in the valid switch area 100 among the setting data D0-0 and D1-0 stored in the switch area 100. In the setting data stored in the valid switch area 100, when the divided area CNF_0 is specified, it means that the divided area CNF_0 is a valid divided area and the divided area CNF_1 is an invalid divided area. Conversely, when the divided area CNF_1 is specified in the setting data stored in the valid switch area 100, it means that the divided area CNF_1 is a valid divided area and the divided area CNF_0 is an invalid divided area. When the setting data read from the switch area 100 for setting various functions is stored in a register (not shown) at the time of starting the microcontroller 10, the flash sequencer 17 may determine which one of the divided area CNF_0 and CNF_1 is an invalid area by referring to the value of the register (not the setting data of the switch area 100).

If the invalid divided area is the divided area CNF_1, the process proceeds to S711 after S700, and if the invalid divided area is the divided area CNF_0, the process proceeds to S721 after S700. In Step 711 (S711), the flash sequencer 17 deletes the divided area CNF_1. In Step 721 (S721), the flash sequencer 17 deletes the divided area CNF_0.

The operation of the flash sequencer 17 in the case of receiving the "setting area erase" command for the security setting area 300B and the block protection setting area 300C is also the same as the operation shown in FIG. 20, but the setting data of the switch area 100 referred to in S700 and the erase target area differ depending on the area to be processed. Specifically, in the security setting area 300B, the data of the switch area 100 to be referred to is the setting data D0-1 or the setting data D1-1, and the area to be erased is the divided area EC_0 or the divided area EC_1. In the block protection setting area 300C, the data of the switch area 100 to be referred to becomes the setting data D0-2 or D1-2, and the area to be erased becomes the divided area BP_0 or the divided area BP_1.

Figure 21:
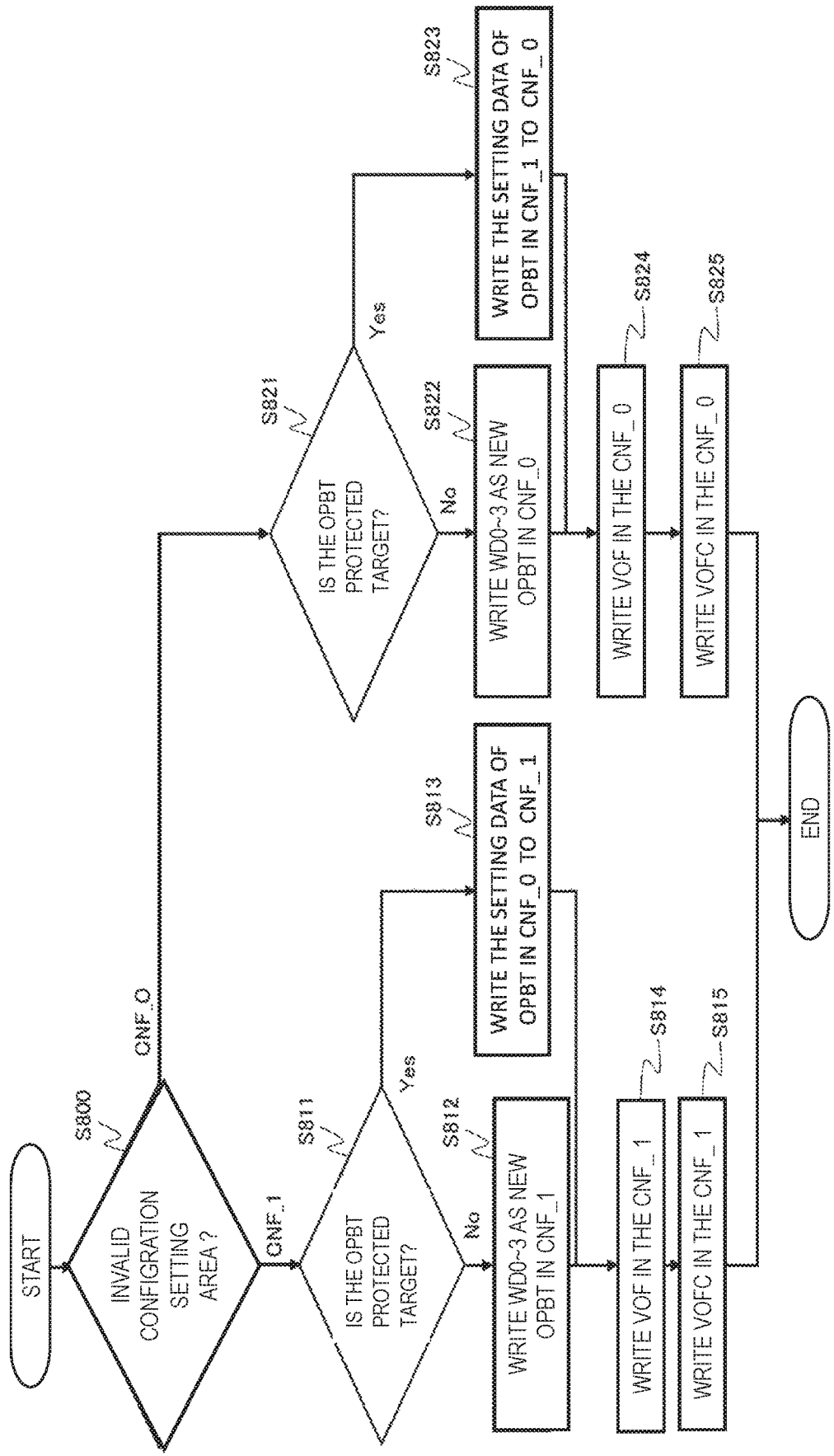
FIG. 21 is a flow chart showing an example of the operation of the flash sequencer 17 when a "setting area write" command is received with the address of the configuration setting area 300A set to the addressing register.

FIG. 21 is a flowchart showing an example of the operation of the flash sequencer 17 in the case where the "setting area write" command is received in a state where the address of the configuration setting area 300A is set in the address specifying register. The "setting area write" command is, for example, a write command in units of 16 bytes, and addresses of the respective function setting data OPBTi can be set in units of 16 bytes in the addressing register. When the flash sequencer 17 receives the "write set area" command, the flash sequencer 17 writes the specified function setting data OPBTi in the invalid divided area of the divided area of the setting area 300.

Incidentally, the respective function setting data OPBTi can be protected to prohibit the change of values by any protection function using protection setting bits, ID authentication, or the like. For this reason, when the function setting data OPBTi is to be protected, it is required to prohibit the writing of the writing content specified by the "setting area writing" command. Therefore, the flash sequencer 17 performs a different operation depending on whether or not the received "write setting area" command is a new write command for the function setting data OPBTi to be protected. Hereinafter, the flow of the operation of the flash sequencer 17 in the case of receiving the "write setting area" command will be described with reference to FIG. 21.

In Step 800 (S800), as in S700 of FIG. 20, the flash sequencer 17 determines which of the divided area CNF_0 and CNF_1 is an invalid area, that is, which area is not a valid area.

When the invalid area is the divided area CNF_1, the writing process is performed on the divided area CNF_1 in Steps 811 to 815. Hereinafter, the operation in the case where the invalid area is the divided area CNF_1 will be described.

In Step 811 (S811), the flash sequencer 17 determines whether the received "write setting area" command is a new write command for the protected function setting data OPBTi. The flash sequencer 17 performs this determination by a confirmation method according to the implemented protection function. For example, when the protection is set by the protection setting bit, the flash sequencer 17 determines whether or not the function setting data OPBTi is a protection target by referring to the protection setting bit corresponding to the function setting data OPBTi.

When the function setting data OPBTi to be written is not to be protected (NO in S811), in Step 812 (S812), the flash sequencer 17 writes the WD0, the WD1, the WD2, and the WD3 received from the CPU 11 as new function setting data OPBTi in the divided area CNF_1 which is an invalid area. On the other hand, when the function setting data OPBTi to be written is to be protected (YES in S811), in Step 813 (S813), the flash sequencer 17 writes the setting values of the function setting data OPBTi of the divided area CNF_0, which is a valid area, to the divided area CNF_1, which is an invalid area. That is, the flash sequencer 17 copies the set value. As a result, the setting value of the function setting data OPBTi is maintained, and the change to a different value can be prohibited. After S812, or after S813, processing moves to S814.

When the writing of the function setting data OPBTi is completed, the flash sequencer 17 writes predetermined values indicating the completion of the writing of the function setting data OPBTi as the write completion flag VOFi in the divided area CNF_1 in Step 814 (S814). Thereafter, in Step 815 (S815), a predetermined value indicating the completion of writing of the write completion flag VOFi is written as the write completion flag VOFCi. As a result, the operation of writing the setting area is completed.

On the other hand, when the invalid area is the divided area CNF_0, the writing process is performed on the divided area CNF_0 in Steps 821 to 825. Steps 821 to 825 are similar to Steps 811 to 815 described above, except that the invalid area are reversed. That is, when the write target function setting data OPBTi is not the protection target (NO in S821), the flash sequencer 17 writes the WD0, the WD1, the WD2, and the WD3 to the divided area CNF_0 (S822), and when the write target function setting data is the protection target, the flash sequencer 17 copies the setting values of the function setting data OPBTi of the divided area CNF_1 to the divided area CNF_0 (S823). In Steps 824 and 825, the flash sequencer 17 writes the write completion flag VOFi and the write completion flag VOFCi in the divided area CNF_0.

The operation of the flash sequencer 17 when the "write setting area" command is received for the security setting area 300B and the block protection setting area 300C is the same as the operation shown in FIG. 21, but the write target area differs depending on the area to be processed. Specifically, in the case of the security setting area 300B, the write target area is the divided area EC_0 or the divided area EC_1. In the case of the block protection setting area 300C, the write target area is the divided area BP_0 or the divided area BP_1.

As shown in Steps 813 and 823 of FIG. 21, when the function setting data OPBTi protected, the flash sequencer 17 writes the function setting data stored on the other side instead of the new function setting data when the writing instruction of the new function setting data OPBTi is received from one of the two memory area (fragmented area) that form the pair. As a result, it is possible to prevent the function setting data OPBTi to be protected from being rewritten by another data.

When updating the setting area 300, the CPU 11 sequentially executes a "setting area erase" command and a "setting area write" command for all the device setting data OPBTi (i.e., the function setting data OPBT0, . . . , OPBTx) in accordance with a program (software) for updating the function setting data, for example. As a result, a new setting value is stored in the configuration setting area 300A, the security setting area 300B, or the block protection setting area 300C in the invalid divided area.

FIGS. 22A and 22B show an example of each value when the "set area erase" command and the "set area write" command are executed. In this example, however, the transition of the value in the case where a new setting value is stored in the invalid divided area CNF_0 of the configuration setting area 300A using the "setting area erase" command and the "setting area write" command is shown. FIG. 22A is a table showing transition of each function setting data and each flag in the divided area CNF_0. FIG. 22B is a table showing transition of each function setting data and each flag in the divided area CNF_1.

As shown in FIG. 22A, when the "setting area erase" command and the "setting area write" command for the respective function setting data OPBTi are executed, in the invalid divided area CNF_0, first, the function setting data and the flag are erased, and thereafter, writing of new function setting data OPBTi and write completion flags VOFi and VOFCi is repeated. During this time, as shown in FIG. 22B, no change in the value occurs in the effective divided area CNF_1. In FIGS. 22A and 22B, the update of the configuration setting area 300A is exemplified, but the security setting area 300B and the block protection setting area 300C can also store a new setting value in a division area which is invalid by the same procedure.

Figure 23:
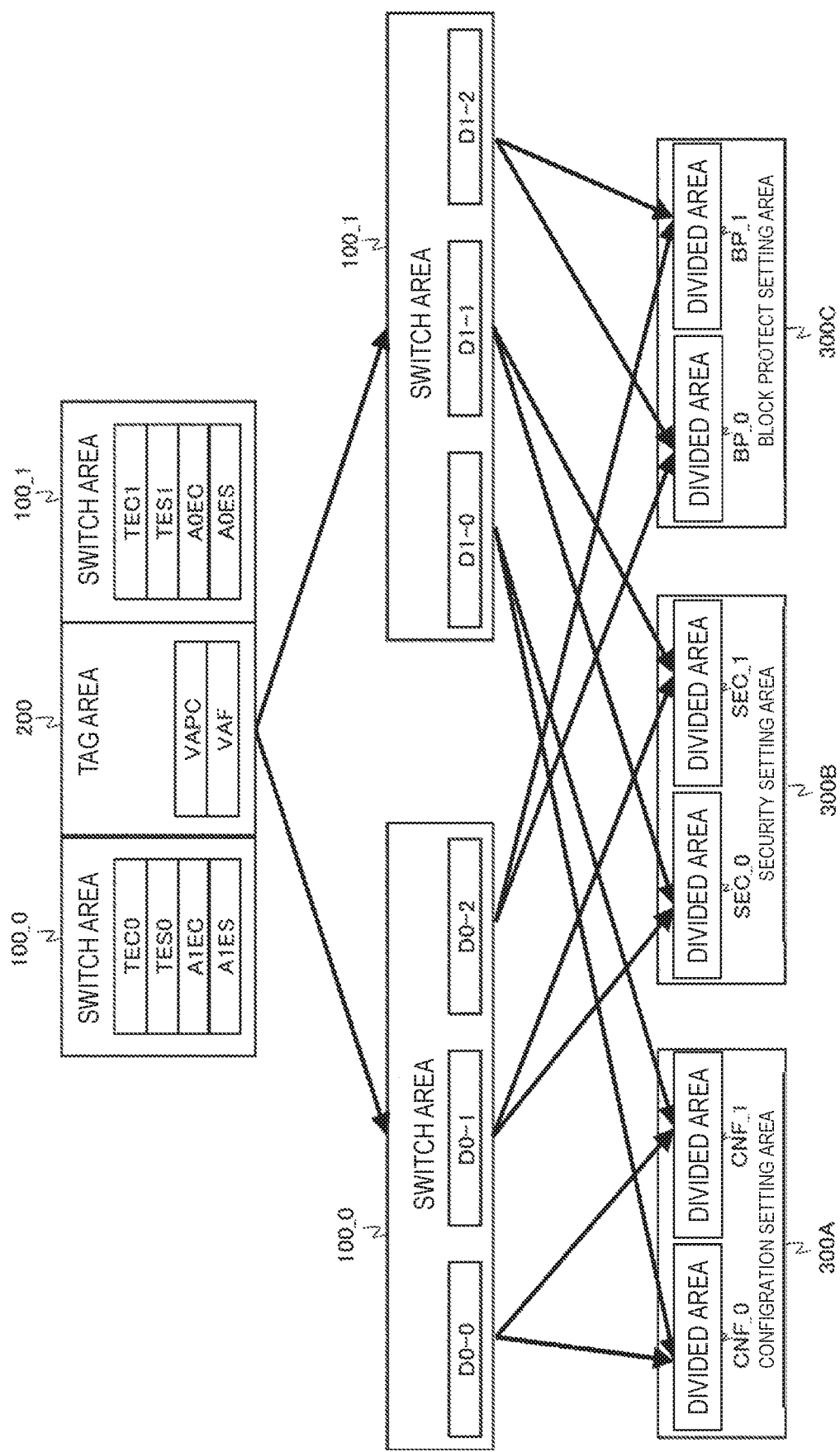
FIG. 23 is a schematic diagram showing a relationship between a switch area 100_0/switch area 100_1/tag area 200 and a configuration setting area 300A/security setting area 300B/block protection setting area 300C.

FIG. 23 is a schematic diagram showing the relationship between the switch area 100_0/switch area 100_1/tag area 200 and the configuration setting area 300A/security setting area 300B/block protection setting area 300C. The switch area 100 in which the valid setting data is stored, i.e., the valid switch area 100, is determined by the flags of the switch area 100_0, the switch area 100_1, and the tag area 200 according to FIG. 12. Further, the effective divided area of the configuration setting area 300A, the effective divided area of the security setting area 300B, and the effective divided area of the block protection setting area 300C are determined by the setting data of the valid switch area 100.

Here, the setting data D0-0 of the switch area 100_0 and the setting data D1-0 of the switch area 100_1 are data specifying one of the divided area of the configuration setting area 300A.

In other words, the setting data D0-0 and D1-0 are data specifying either the function setting data stored in the divided area CNF_0 or the function setting data stored in the divided area CNF_1. The setting data D0-1 of the switch area 100_0 and the setting data D1-1 of the switch area 100_1 are data specifying one of the divided area of the security setting area 300B. In other words, the setting data D0-1 and D1-1 are data specifying either the device setting data stored in the divided area EC_0 or the function setting data stored in the divided area EC_1. The setting data D0-2 of the switch area 100_0 and the setting data D1-2 of the switch area 100_1 are data specifying one of the divided area of the block-protection setting area 300C. In other words, the setting data D0-2 and D1-2 are data specifying either the function setting data stored in the divided area BP_0 or the function setting data stored in the divided area BP_1.

Since each area has a relationship as shown in FIG. 23, when switching to new function setting data stored in the setting area 300, four commands may be executed as shown in FIG. 11A, FIG. 11B, and FIG. 11C after storing new function setting data in an invalid divided area of the setting area 300. That is, by executing four commands in order of a "switch area erase" command, a "switch area write" command, a "tag area erase" command, and a "tag area update" command, the setting data of the switch area 100 may be changed to data specifying a divided area in which new function setting data is stored.

Figure 24:
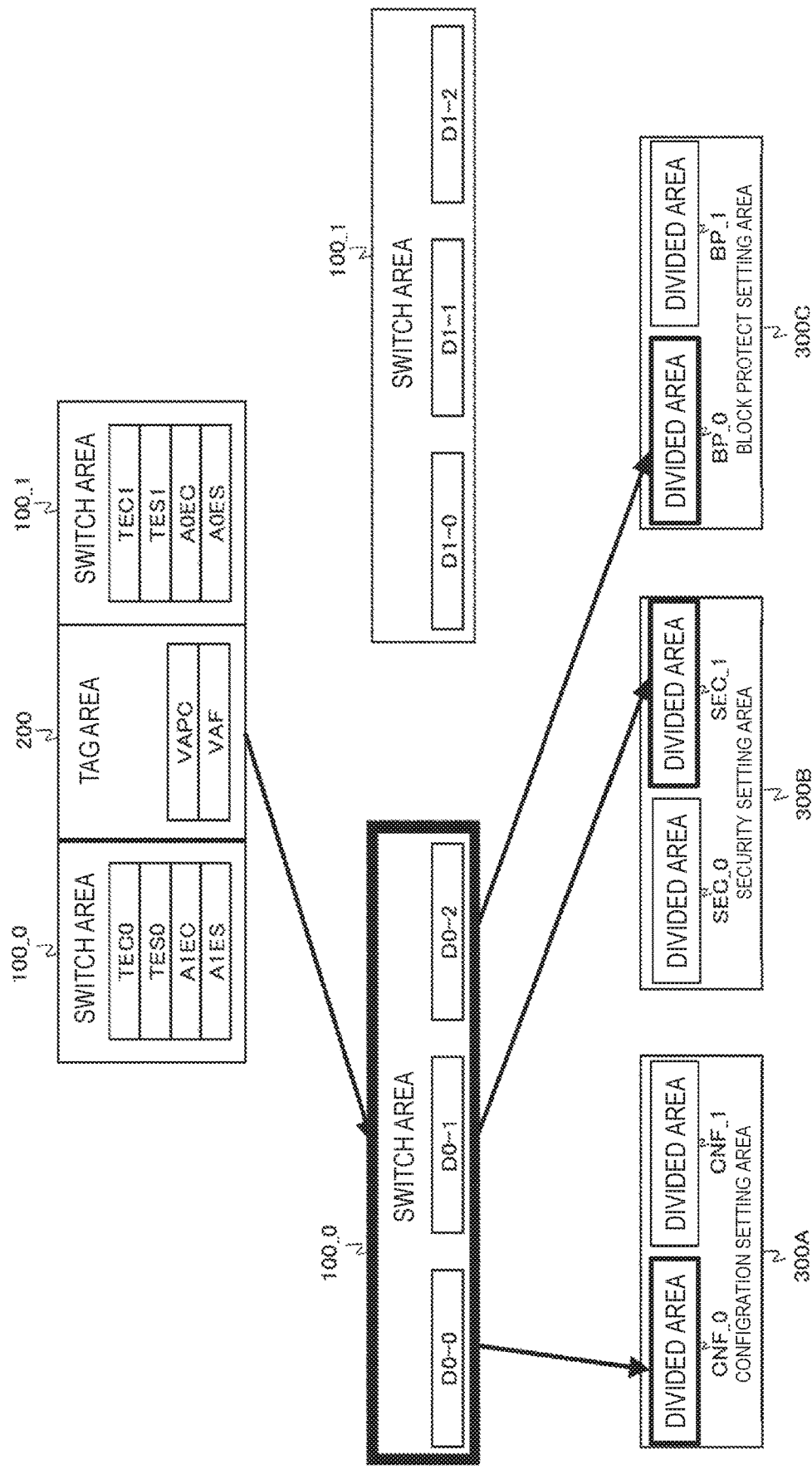
FIG. 24 is showing an example of the state of the microcontroller 10.
Figure 25:
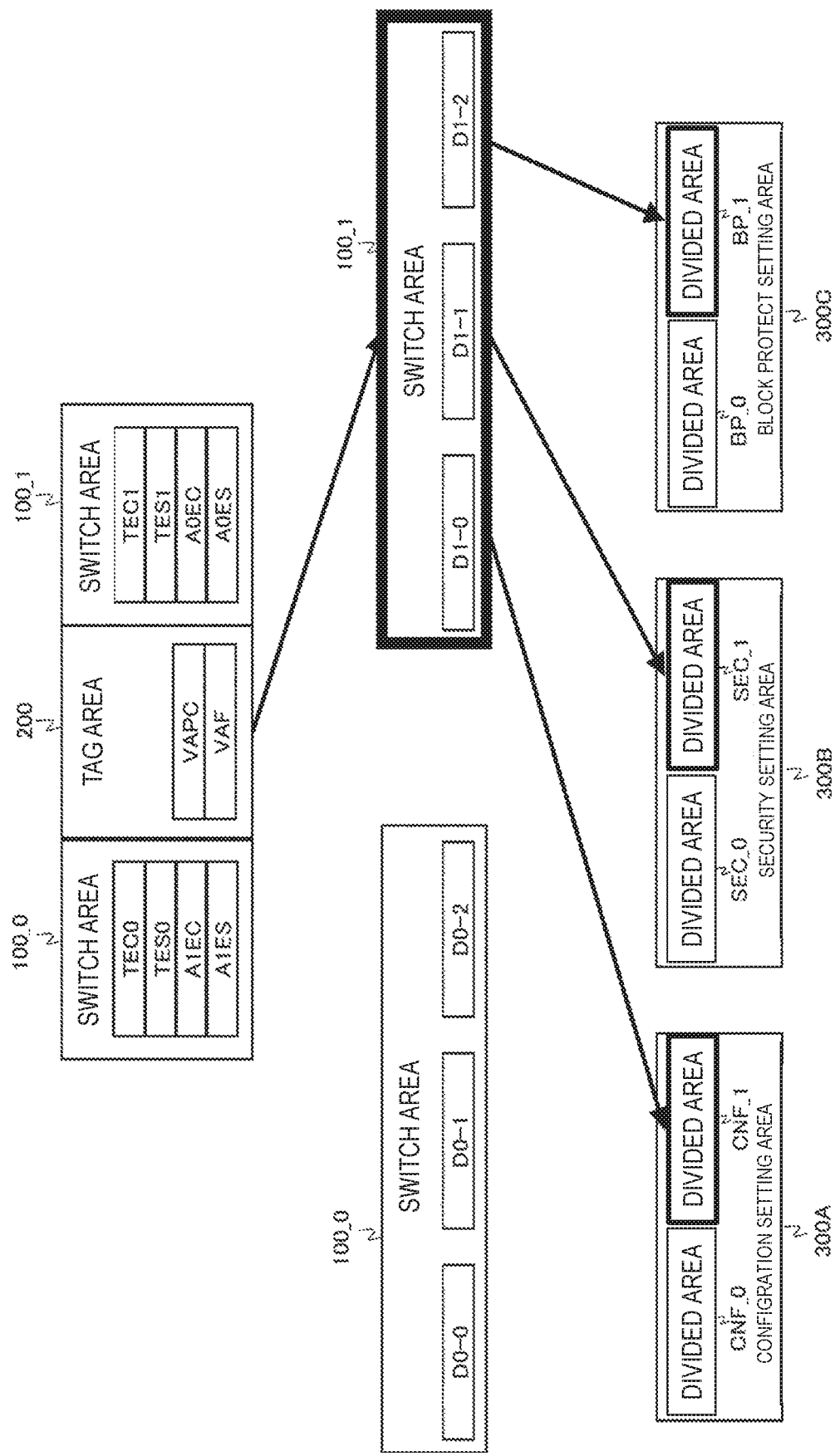
FIG. 25 is showing an example of the state of the microcontroller 10.

An arbitrary value can be set in each setting data of the switch area 100. Accordingly, from the state in which the dividing area CNF_0, the dividing area EC_1, and the dividing area BP_0 are respectively selected as active area in the setting data of the switch area 100_0 as shown in FIG. 24, it is possible to switch the dividing area CNF_1, the dividing area EC_1, and the dividing area BP_1 to the state in which the dividing area CNF_1 and the dividing area BP_1 are respectively selected as active area in the setting data of the switch area 100_1 as shown in FIG. 25. That is, it is also possible to use the microcontroller 10 without switching only the security setting.

It is also possible to update only the switch area 100 and the tag area 200 regardless of whether or not the setting area 300 is updated. Therefore, when setting data for selecting the divided area CNF_0, the divided area EC_1, and the divided area BP_0 is written in the switch area 100_0 after erase the switch area 100_0, and further tag area erase and tag updating are performed, the function setting of the microcontroller 10 can be returned to the same state as in FIG. 24. That is, rollback can be performed.

Figure 26:
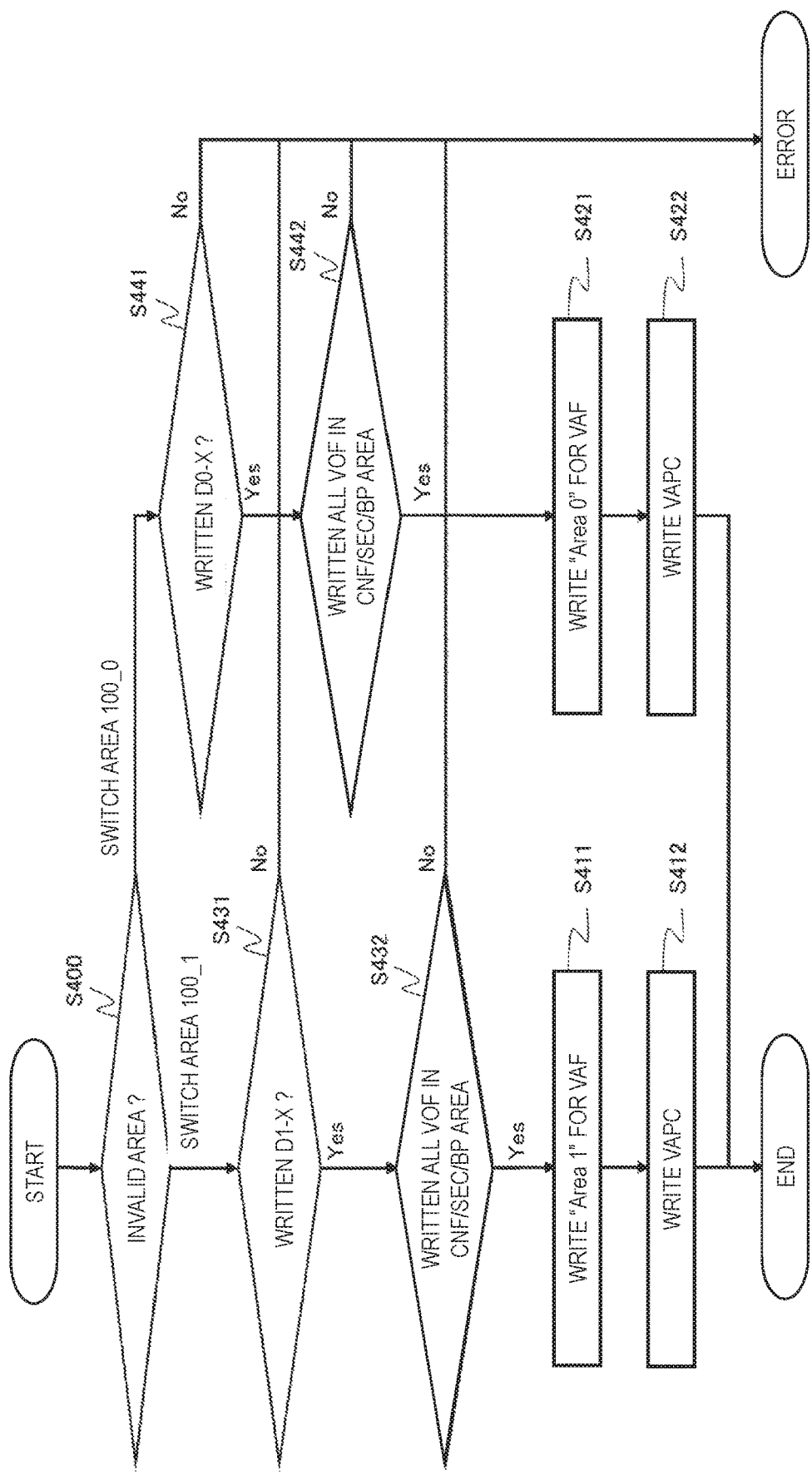
FIG. 26 is a flow chart showing an example of the operation of the flash sequencer 17 according to the third embodiment when a "tag area update" command is received.

Although it has the above-mentioned advantage that only the switch area 100 and the tag area 200 can be independently updated, if the divided area in the erased state is erroneously selected by the update of the switch area 100 and the tag area 200, the setting of various functions of the microcontroller 10 disappears, which may cause a system failure. In order to avoid such problems, in the present embodiment, the flash sequencer 17 determines the writing status of the setting area 300 and updates the tag area. FIG. 26 is a flow chart showing an exemplary operation of the flash sequencer 17 according to the third embodiment when the "tag area update" command is received. The flowchart of FIG. 26 differs from the flowchart of FIG. 10 in that S431, S432, S441, and S442 are added after S400. The flow of the operation of the present embodiment flash sequencer 17 at the time of receiving the "tag area update" command will be described below with reference to FIG. 26.

In the present embodiment, when the invalid switch area 100 is determined (S400), the flash sequencer 17 confirms the write state of the setting data of the invalid switch area 100 (Steps 431 and 441) and the write state of the setting area 300 (Steps 432 and 442).

First, a case where the invalid switch area 100 is the switch area 100_1 will be described. In this case, after S400, the process proceeds to Step 431. In Step 431 (S431), the flash sequencer 17 determines whether all the setting data (i.e., the setting data D1-0, the D1-1, and the D1-2) of the switch area 100_1 has been written. If all the setting data of the switch area 100_1 has been written (Yes in S431), the process proceeds to Step 432. On the other hand, if any setting data of the switch area 100_1 has not been written (No in S431), the process ends in error. That is, in this case, the tag area 200 is not updated.

In Step 432 (S432), the flash sequencer 17 determines whether all the write completion flags VOFi in the divided area specified by the setting data written in the switch area 100_1 have been written. When all the write completion flags VOFi have been written (YES in S432), the same processing as the processing shown in FIG. 10 (Steps 411 and 412) is performed. On the other hand, if not all of the write completion flags VOFi have been written (NO in S432), the process ends in error. That is, in this case, the tag area 200 is not updated.

As described above, when writing the valid switch area flag VAF indicating that the switch area which is valid is the switch area 100_1 in the tag area 200, the flash sequencer 17 performs writing of the valid switch area flag VAF only when the setting data D1-0, the setting data D1-1, and the setting data D1-2 are stored in the switch area 100_1 and the function setting data is stored in the divided area designated by the stored setting data D1-0, the D1-1, and the D1-2. In other words, when writing the valid switch area flag VAF indicating that the valid setting data is the setting data of the switch area 100_1 in the tag area 200, the flash sequencer 17 performs the writing of the valid switch area flag VAF only when the setting data is stored and the function setting data specified by the stored setting data is stored in the setting area 300. By doing so, it is possible to prevent erroneous selection of a divided area in an erased state.

If the invalid switch area 100 is the switch area 100_0, the process proceeds to Step 411 after Step 400. In Step 441 (S441), the flash sequencer 17 determines whether all the setting data (i.e., the setting data D0-0, the setting data D0-1, and the setting data D0-2) of the switch area 100_0 have been written. If all the setting data of the switch area 100_0 has been written (Yes in S441), the process proceeds to Step 442. On the other hand, if any setting data of the switch area 100_0 has not been written (No in S441), the process ends in error. That is, in this case, the tag area 200 is not updated.

In Step 442 (S442), the flash sequencer 17 determines whether all the write completion flags VOFi of the divided area specified by the setting data written in the switch area 100_0 have been written. When all the write completion flags VOFi have been written (YES in S442), the same processing as the processing shown in FIG. 10 (Steps 421 and 422) is performed. On the other hand, if not all of the write completion flags VOFi have been written (NO in S442), the process ends erroneously. That is, in this case, the tag area 200 is not updated.

As described above, when writing the valid switch area flag VAF indicating that the switch area which is valid is the switch area 100_0 in the tag area 200, the flash sequencer 17 performs writing of the valid switch area flag VAF only when the setting data D0-0, the setting data D0-1, and the setting data D0-2 are stored in the switch area 100_0 and the function setting data is stored in the divided area designated by the stored setting data D0-0, the D0-1, and the D0-2. In other words, when writing the valid switch area flag VAF indicating that the valid setting data is the setting data of the switch area 100_0 in the tag area 200, the flash sequencer 17 performs the writing of the valid switch area flag VAF only when the setting data is stored and the function setting data specified by the stored setting data is stored in the setting area 300. By doing so, it is possible to prevent erroneous selection of a divided area in an erased state.

When it is considered that the write status of the write completion flag VOFi is insufficient for retention, and the values may change with time, the operation of the system may become unstable by executing the process of FIG. 26. Therefore, prior to the execution of the process of FIG. 26, the write completion flag VOFCi written immediately after the execution of the write of the write completion flag VOFi may be checked. The flash sequencer 17 may execute the process of FIG. 26 only when the write completion flag VOFCi indicates the completion of writing of the write completion flag VOFi. This makes it possible to stabilize the operation of the system.

In present embodiment, the flash sequencer 17 confirms the write completion flag VOFi (Steps 432 and 442 in FIG. 26) so that the flash sequencer operates properly even when the read-prohibition protection is set for the function setting data.

That is, the flash sequencer 17 confirms the write completion flag VOFi so that the operation can be performed properly even if the write status of the function setting data cannot be checked by referring to the function setting data. Therefore, in a system in which the protection of the read prohibition is not set for the function setting data, the flash sequencer 17 may confirm the write state of the function setting data by referring to the function setting data. In this instance, prior to executing the process of FIG. 26, the write completion flag VOFi may be checked instead of the write completion flag VOFCi. That is, in such a configuration, the write completion flag VOFCi is not necessary.

Third embodiment has been described above. In the present embodiment, the flash memory for function setting 15 includes a switch area 100_0, a switch area 100_1, and a tag area 200, as well as two memory area in which function setting data for a predetermined function stored. Here, the two memory area in which the function setting data for the predetermined function is stored are, for example, the divided area CNF_0 and the divided area CNF_1. The two memory area may be the divided area EC_0 and the divided area EC_1, or may be the divided area BP_0 and the divided area BP_1. When one of the two memory area is referred to as a memory area A and the other is referred to as a memory area B, the setting data of the switch area 100_0 and the switch area 100_1 in the present embodiment can be said to be the following data. That is, the setting data of the switch area 100_0 and the switch area 100_1 are data for specifying either the function setting data stored in the memory area A or the function setting data stored in the memory area B. According to such a configuration, even when the processing is interrupted during the update of the valid switch area flag VAF and the valid switch area flag VAF becomes an uncertain value, the function setting data to be applied to the microcontroller 10 can be uniquely specified.

In particular, it is also possible to include n sets of two memory area in which function setting data for a predetermined function is stored, where n is an integer greater than or equal to 2. In the above described configuration, the flash memory for function setting 15 includes three such pairs (divided area CNF_0 and CNF_1, divided area SEC_0 and SEC_1, and divided area BP_0 and BP_1). The switch area 100_0 and the switch area 100_1 both store n pieces of setting data. According to such a configuration, a combination of function setting data to be applied can be freely switched. Therefore, for example, the switching from the state shown in FIG. 24 to the state shown in FIG. 25, and the rollback after the switching can be easily realized.

Further, as illustrated in FIG. 21, when receiving a write instruction for the function setting data of the protected object, the flash sequencer 17 performs a copy of the function setting data of the valid division area instead of writing the received data. Therefore, it is possible to protect the setting value of the function setting data from being changed to an incorrect value. As shown in FIG. 26, when updating the tag area 200, the flash sequencer 17 confirms the write completion flaw VOFi of the divided area elected after the update, thereby preventing the setting of various functions from disappearing.

In all of the embodiments described above, each element for performing the above described processing can be configured by a processor, a memory, or other circuits in terms of hardware, and is realized by a program or the like loaded into the memory in terms of software. Thus, those skilled in the art will appreciate that these processes can be implemented in various forms by hardware alone, software alone, or a combination thereof, and are not limited to either.

Also, the program described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magnet optical recording media (e.g., magnet optical disks), CD-ROM(Read Only Memory, a CD-R, a CD-R/W, solid-state memories e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Although the invention made by the inventor has been specifically described based on the embodiment, the present invention is not limited to the embodiment already described, and it is needless to say that various modifications can be made without departing from the gist thereof.

What is claimed is:

1. A information processing device comprising:
    a storage unit including:
        a first memory area storing first data;
        a second memory area storing a second data; and
        a third memory area storing a valid instruction flag indicating which of the first data and the second data is valid; and
    a processor configured to:
        determine which of the first data and the second data is valid based on the valid instruction flag;
        store, in the storage unit, a first update status flag indicating an update status of the first data, a second update status flag indicating an update status of the second data, and a third update status flag indicating an update status of the valid instruction flag; and determine which of the first data and the second data is valid based on values of the first update status flag, the second update status flag, and the third update status flag when it is impossible to determine which of the first data and the second data is valid based on the valid instruction flag.

2. The information processing device according to claim 1, wherein the first update status flag is a flag indicating whether or not erase processing of the first memory area performed for updating the first data has been started or completed, wherein the second update status flag is a flag indicating whether or not erase processing of the second memory area performed for updating the second data has been started or completed, and wherein the third update status flag is a flag indicating whether or not erase processing of the third memory area performed for updating the valid instruction flag has been started or completed.

3. The information processing device according to claim 1, wherein the processor is further configured to erase the first memory area or the second memory area only when the valid instruction flag is stored in the third memory area.

4. The information processing device according to claim 1, wherein the processor is further configured to:

erase the third memory area only when the second data is stored in the second memory area when currently valid data is the first data, and erase the third memory area only when the first data is stored in the first memory area when the currently valid data is the second data.

5. The information processing device according to claim 1, wherein a write completion flag indicating whether or not writing of the valid instruction flag is completed is further stored in the storage unit, and wherein the processor is further configured to erase the first memory area or the second memory area only when the write completion flag indicates completion of writing.

6. The information processing device according to claim 1, wherein a first write completion flag indicating whether or not writing of the first data is completed and a second write completion flag indicating whether or not writing of the second data is completed are further stored in the storage unit, and wherein the processor is further configured to erase the third memory area only when the first write completion flag or the second write completion flag indicates completion of writing of data to be newly validated.

7. The information processing device according to claim 1, wherein the storage unit further comprises a fourth memory area and a fifth memory area each storing function setting data for a predetermined a function, and wherein the first data and the second data are data specifying either the function setting data stored in the fourth memory area or the function setting data stored in the fifth memory area.

8. The information processing device according to claim 7, wherein when the function setting data is protected and when an instruction to write new function setting data to one of the fourth memory area and the fifth memory area is received, the processor is further configured to write the function setting data stored in another one of the fourth memory area and the fifth memory area to the one of the fourth memory area and the fifth memory area instead of the new function setting data.

9. The information processing device according to claim 7, wherein the processor is further configured to perform writing of the valid instruction flag only when the first data is stored and the function setting data specified by the stored first data is stored when the valid instruction flag indicating that the valid data is the first data is written in the third memory area.

10. The information processing device according to claim 7, wherein the storage unit includes n sets of the fourth memory area and the fifth memory area, where n is an integer greater than or equal to 2, the first memory area stores n pieces of the first data, and the second memory area stores n pieces of the second data.

11. The information processing device according to claim 1, wherein the storage unit is a flash memory, and wherein the processor is further configured to store the first update status flag in the second memory area, the second update status flag in the first memory area, and the third update status flag in the first memory area or the second memory area.

12. A control method comprising the steps of:

storing a first update status flag indicating an update status of a first data, a second update status flag indicating an update status of a second data, and a third update status flag indicating an update status of a valid instruction flag in a storage unit including a first memory area in which first data is stored, a second memory area in which second data is stored, and a third memory area in which the valid instruction flag indicating which of the first data and the second data is stored;

determining which of the first data and the second data is valid based on the valid instruction flag; and determining which of the first data and the second data is valid based on values of the first update status flag, the second update status flag, and the third update status flag when it is impossible to determine which of the first data and the second data is valid based on the valid instruction flag.

* * * * *